(12) United States Patent
Rickman et al.

(10) Patent No.: US 10,491,973 B2
(45) Date of Patent: *Nov. 26, 2019

(54) OPTOELECTRONIC SWITCH

(71) Applicant: ROCKLEY PHOTONICS LIMITED, London (GB)

(72) Inventors: Andrew George Rickman, Marlborough (GB); Nathan Farrington, Arcadia, CA (US); Amit Singh Nagra, Altadena, CA (US); Cyriel Johan Agnes Minkenberg, Neuheim (CH); Thomas Pierre Schrans, Temple City, CA (US)

(73) Assignee: Rockley Photonics Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,348

(22) Filed: Dec. 23, 2016

(65) Prior Publication Data

US 2017/0117966 A1 Apr. 27, 2017
US 2018/0183524 A2 Jun. 28, 2018

Related U.S. Application Data

(63) Continuation of application No. PCT/EP2016/076756, filed on Nov. 4, 2016, which is
(Continued)

(30) Foreign Application Priority Data

Jun. 28, 2016 (GB) .................................. 1611197.3
Jun. 30, 2016 (GB) .................................. 1611433.2

(51) Int. Cl.
*H04Q 11/00* (2006.01)
*H04L 12/933* (2013.01)

(52) U.S. Cl.
CPC ......... *H04Q 11/0066* (2013.01); *H04L 49/15* (2013.01); *H04L 49/1515* (2013.01);
(Continued)

(58) Field of Classification Search
None
See application file for complete search history.

(56) References Cited

U.S. PATENT DOCUMENTS 6,285,809 B1 9/2001 Nir et al.
6,341,023 B1 * 1/2002 Puc .................... H04B 10/2507
398/79
(Continued)

FOREIGN PATENT DOCUMENTS

CA 2 386 352 A1 11/2003
EP 0 949 837 A2 10/1999
(Continued)

OTHER PUBLICATIONS

Verma et al., Optical Burst Switching: A Viable Solution for Terabit IP Backbone, 2000, IEEE, pp. 48-52.*
(Continued)

*Primary Examiner* — Kenneth N Vanderpuye
*Assistant Examiner* — Jai M Lee
(74) *Attorney, Agent, or Firm* — Lewis Roca Rothgerber Christie LLP

(57) ABSTRACT

An L-dimensional optoelectronic switch for transferring an optical signal from an input device to an output device, the optoelectronic switch includes: a plurality of leaf switches, each having a radix R, and arranged in an L-dimensional array, in which each dimension i has a respective size $R_i$ (i=1, 2, . . . , L), each leaf switch having an associated L-tuple of co-ordinates $(x_1, \ldots, x_L)$ giving its location with respect to each of the L dimensions; wherein each leaf switch is a member of L sub-arrays, each of the L sub-arrays
(Continued)

associated with a different one of the L dimensions, and including: a plurality of $R_i$ leaf switches, whose co-ordinates differ only in respect of the $i^{th}$ dimension, each leaf switch having C client ports for connecting to an input device or an output device, and F fabric ports for connecting to spine switches; a plurality of $S_i$ spine switches, each having R fabric ports for connecting to the fabric ports of the leaf switches, and wherein, in a given sub-array each leaf switch in the sub-array is connected to each spine switch via an optical active switch.

36 Claims, 13 Drawing Sheets

Related U.S. Application Data a continuation-in-part of application No. 15/072,314, filed on Mar. 16, 2016, now Pat. No. 9,706,276, and a continuation-in-part of application No. PCT/GB2016/051127, filed on Apr. 22, 2016, which is a continuation-in-part of application No. 15/072,314, filed on Mar. 16, 2016, now Pat. No. 9,706,276, application No. 15/390,348, which is a continuation-in-part of application No. PCT/GB2016/051127, filed on Apr. 22, 2016, which is a continuation-in-part of application No. 15/072,314, filed on Mar. 16, 2016, now Pat. No. 9,706,276.

(60) Provisional application No. 62/251,572, filed on Nov. 5, 2015, provisional application No. 62/309,425, filed on Mar. 16, 2016, provisional application No. 62/152,696, filed on Apr. 24, 2015, provisional application No. 62/234,454, filed on Sep. 29, 2015, provisional application No. 62/354,600, filed on Jun. 24, 2016.

(52) U.S. Cl.
CPC ......... *H04Q 11/00* (2013.01); *H04Q 11/0005* (2013.01); *H04Q 11/0071* (2013.01); *H04Q 2011/0032* (2013.01); *H04Q 2011/0033* (2013.01); *H04Q 2011/0056* (2013.01); *H04Q 2011/0096* (2013.01)

(56) References Cited

U.S. PATENT DOCUMENTS

| | | | |
|---|---|---|---|
| 6,456,752 B1* | 9/2002 | Dragone | H04Q 11/0005 385/17 |
| 6,510,260 B2 | 1/2003 | Chen et al. | |
| 6,512,612 B1 | 1/2003 | Fatehi et al. | |
| 6,529,301 B1 | 3/2003 | Wang | |
| 7,088,919 B2 | 8/2006 | Graves | |
| 7,177,544 B1 | 2/2007 | Wada et al. | |
| 7,218,853 B2 | 5/2007 | Handelman | |
| 7,257,283 B1 | 8/2007 | Liu et al. | |
| 7,260,329 B1 | 8/2007 | Fall et al. | |
| 7,389,046 B1 | 6/2008 | Tanaka et al. | |
| 7,426,210 B1* | 9/2008 | Miles | H04J 14/0223 370/400 |
| 7,526,603 B1 | 4/2009 | Abdollahi-Alibeik et al. | |
| 7,577,355 B2 | 8/2009 | Sato et al. | |
| 7,590,359 B2 | 9/2009 | Kim et al. | |
| 7,724,759 B2 | 5/2010 | Bozso et al. | |
| 7,764,882 B2 | 7/2010 | Beacken | |
| 7,773,606 B2 | 8/2010 | Dobjelevski et al. | |
| 7,773,608 B2 | 8/2010 | Miles et al. | |
| 7,872,990 B2 | 1/2011 | Guo et al. | |
| 7,899,327 B2 | 3/2011 | Wada et al. | |
| 8,065,433 B2 | 11/2011 | Guo et al. | |
| 8,073,327 B2 | 12/2011 | Mayer et al. | |
| 8,098,593 B2 | 1/2012 | Guo et al. | |
| 8,270,830 B2 | 9/2012 | Kirkpatrick et al. | |
| 8,472,805 B2 | 6/2013 | Lam et al. | |
| 8,473,659 B2 | 6/2013 | Koka et al. | |
| 8,493,976 B2 | 7/2013 | Lin | |
| 8,774,625 B2 | 7/2014 | Binkert et al. | |
| 8,792,787 B1 | 7/2014 | Zhao et al. | |
| 8,867,915 B1* | 10/2014 | Vahdat | H04B 10/27 398/55 |
| 8,891,914 B2 | 11/2014 | Ticknor et al. | |
| 8,902,751 B1 | 12/2014 | Zhou et al. | |
| 8,942,559 B2 | 1/2015 | Binkert et al. | |
| 9,008,510 B1* | 4/2015 | Zhao | H04Q 11/0005 370/244 |
| 9,124,383 B1 | 9/2015 | Frankel et al. | |
| 9,167,321 B2 | 10/2015 | Chen | |
| 9,184,845 B1 | 11/2015 | Vandat et al. | |
| 9,584,373 B2* | 2/2017 | Schlansker | H04L 49/65 |
| 9,602,434 B1* | 3/2017 | Saleh | H04L 49/25 |
| 9,980,021 B2* | 5/2018 | Oltman | H04Q 11/0005 |
| 2002/0057861 A1 | 5/2002 | Ge et al. | |
| 2002/0114036 A1 | 8/2002 | Ghani | |
| 2002/0159684 A1* | 10/2002 | Sun | G02F 1/225 385/20 |
| 2002/0186432 A1 | 12/2002 | Roorda et al. | |
| 2002/0196778 A1* | 12/2002 | Colmant | H04L 12/5601 370/352 |
| 2003/0138189 A1 | 7/2003 | Rockwell et al. | |
| 2005/0105906 A1 | 5/2005 | Barbosa et al. | |
| 2006/0171712 A1* | 8/2006 | Tanaka | H04Q 11/0062 398/45 |
| 2006/0221948 A1* | 10/2006 | Benner | H04L 47/10 370/389 |
| 2007/0009262 A1 | 1/2007 | Perkins et al. | |
| 2008/0101225 A1* | 5/2008 | Tassinari | H04L 12/66 370/230 |
| 2008/0219269 A1* | 9/2008 | Minkenberg | H04L 12/66 370/395.4 |
| 2008/0285449 A1* | 11/2008 | Larsson | H04L 49/1515 370/232 |
| 2009/0226183 A1 | 9/2009 | Kang | |
| 2010/0254703 A1* | 10/2010 | Kirkpatrick | H04Q 11/0005 398/45 |
| 2010/0306408 A1* | 12/2010 | Greenberg | H04L 12/4633 709/238 |
| 2011/0302346 A1* | 12/2011 | Vahdat | H04L 49/40 710/301 |
| 2012/0008945 A1* | 1/2012 | Singla | H04J 14/0204 398/49 |
| 2012/0033968 A1 | 2/2012 | Testa et al. | |
| 2012/0148242 A1 | 6/2012 | Chen et al. | |
| 2012/0201540 A1 | 8/2012 | Uekama et al. | |
| 2012/0243869 A1 | 9/2012 | Sato | |
| 2012/0250574 A1* | 10/2012 | Marr | G02B 6/354 370/254 |
| 2013/0156425 A1 | 6/2013 | Kirkpatrick et al. | |
| 2014/0307588 A1* | 10/2014 | Kim | H04L 41/0803 370/256 |
| 2014/0355978 A1* | 12/2014 | Sakata | H04B 10/07955 398/25 |
| 2015/0092561 A1* | 4/2015 | Sigoure | H04L 49/50 370/236 |
| 2015/0103692 A1* | 4/2015 | Jain | H04L 41/0806 370/254 |
| 2015/0249501 A1 | 9/2015 | Nagarajan | |
| 2015/0309265 A1* | 10/2015 | Mehrvar | G02B 6/3546 398/51 |
| 2015/0312134 A1* | 10/2015 | Kapadia | H04L 45/02 370/256 |
| 2016/0337727 A1* | 11/2016 | Graves | H04Q 11/0005 |
| 2016/0381442 A1* | 12/2016 | Heanue | H04Q 11/0005 398/45 |
| 2017/0041691 A1 | 2/2017 | Rickman et al. | |
| 2017/0111294 A1* | 4/2017 | Laor | H04L 49/101 |
| 2017/0134836 A1* | 5/2017 | Sindhu | H04Q 11/0066 |
| 2017/0187614 A1* | 6/2017 | Haramaty | H04L 45/48 |

(56) References Cited

U.S. PATENT DOCUMENTS

| | | | |
|---|---|---|---|
| 2017/0187629 A1* | 6/2017 | Shalev | H04L 43/0823 |
| 2017/0195785 A1* | 7/2017 | Theiler | H04R 3/005 |
| 2017/0295130 A1 | 10/2017 | Mahajan et al. | |

FOREIGN PATENT DOCUMENTS

| | | |
|---|---|---|
| GB | 2530833 A | 4/2016 |
| WO | WO 2007/124514 A2 | 11/2007 |
| WO | WO 2013/063543 A1 | 5/2013 |
| WO | WO 2013/165390 A1 | 11/2013 |
| WO | WO 2014/180292 A2 | 11/2014 |
| WO | WO 2015/060820 A1 | 4/2015 |

OTHER PUBLICATIONS

Andreyev, Alexey et al., "Introducing data centric fabric, the next-generation Facebook data center network", Nov. 14, 2014, 11 pages.

Dong, Ziqian et al., "Hybrid Optoelectronic Packet Switch with Multiple Wavelength Conversion Through an Electronic Packet Switch", IEEE 14th International Conference on High Performance Switching and Routing, 2013, pp. 97-102.

Farrington, Nathan et al., "Facebook's Data Center Network Architecture", Optical Interconnects Conference, May 1, 2013, pp. 49-50.

International Search Report and Written Opinion of the International Searching Authority, dated Jun. 6, 2016, Corresponding to PCT/GB2016/051127, 17 pages.

International Search Report and Written Opinion of the International Searching Authority, dated Feb. 7, 2017, Corresponding to PCT/EP2016/076756, 15 pages.

Kachris, Christoforos et al., "A Survey on Optical Interconnects for Data Centers", IEEE Communications Surveys & Tutorials, 2012, pp. 1021-1036, vol. 14, No. 4.

Kodi, Avinash et al., "Reconfigurable and adaptive photonic networks for high-performance computing systems", Optical Society of America, Applied Optics, Aug. 1, 2009, pp. E13-E23, vol. 48, No. 22.

Padmanabhan, Krishnan et al., "Dilated Networks for Photonic Switching", IEEE Transactions on Communications, Dec. 1987, pp. 1357-1365, vol. COM-35, No. 12.

U.K. Intellectual Property Office Search Report, dated Jan. 30, 2017, for Patent Application No. GB1611433.2, 3 pages.

Guo, Chuanxiong et al., "BCube: A High Performance, Server-centric Network Architecture for Modular Data Centers", SIGCOMM'09, Aug. 17-21, 2009, Barcelona, Spain, pp. 63-74.

Farrington, Nathan et al., "Data Center Switch Architecture in the Age of Merchant Silicon", High Performance Interconnects, Aug. 25, 2009, pp. 93-102.

International Search Report and Written Opinion of the International Searching Authority, dated Jun. 30, 2017, Corresponding to PCT/EP2017/056129, 19 pages.

"2000 Networkers", Campus Switch Architecture Session 2806, Cisco Systems, Inc., 2000, 65 pages.

"66AK2E0x Multicore DSP+ARM KeyStone II System-on-Chip (SoC)", System Interconnect, Texas Instruments Incorporated, 2012-2015, pp. 1-282.

Ahn, Jung Ho et al., "HyperX: Topology, Routing, and Packaging of Efficient Large-Scale Networks", ACM, SC'09, Nov. 14-20, 2009, 11 pages, Portland, Oregon, USA.

Arimilli, Baba et al., "The PERCS High-Performance Interconnect", 18th IEEE Symposium on High Performance Interconnects, 2010, pp. 75-82.

Bhuyan, Laxmi N. et al., "Generalized Hypercube and Hyperbus Structures for a Computer Network", IEEE Transactions on Computers, Apr. 1984, pp. 323-333, vol. C-33, No. 4.

Dumais, Patrick et al., "Scaling up Silicon Photonic Switch Fabrics", IEEE, 2015, pp. 175-176.

"Hot Interconnects 22", IEEE Symposium on High Performance Interconnects, Aug. 26-28, 2014, 1 page, Google Headquarters, Mountain View, California.

Invitation to Pay Additional Fees and Partial Search Report dated Feb. 23, 2017 in related International Application No. PCT/EP2016/076755, 8 pages.

Iyer, Sundar et al., "Techniques for Fast Shared Memory Switches", Stanford HPNG Technical Report TR01-HPNG-081501, 2001, 12 pages.

Mandyam, Lakshmi et al., "Switch Fabric Implementation Using Shared Memory", Freescale Semiconductor, Inc., 2004, pp. 1-8.

Miao, Wang et al., "Novel flat datacenter network architecture based on scalable and flow-controlled optical switch system", Optics Express, Feb. 10, 2014, 8 pages, vol. 22, No. 3.

Miao, Wang et al., "Petabit/s Data Center Network Architecture with Sub-microseconds Latency Based on Fast Optical Switches", Ecoc-ID: 0630, 2015, 3 pages.

Office Action issued in U.S. Appl. No. 15/461,421, dated Dec. 8, 2017, 11 pages.

Parsons, N.J. et al., "Multidimensional Photonic Switches", Photonic Switching II, Proceedings of the International Topical Meeting, Apr. 12-14, 1990, pp. 364-369, Kobe, Japan.

Shekel, Eyal et al., "Optical packet switching", Proc. of SPIE, 2005, pp. 49-62, vol. 5625.

Suzuki, Keijiro et al., "Ultra-compact 8×8 strictly-non-blocking Si-wire PILOSS switch", Optics Express, Feb. 24, 2014, 8 pages, vol. 22, No. 4.

Tabatabaee, Vahid, "Switch Fabric Architectures", University of Maryland, ENTS689L: Packet Processing and Switching, Fall 2006, pp. 1-18.

U.K. Intellectual Property Office Search Report, dated Nov. 29, 2016, Received Dec. 1, 2016, for Patent Application No. GB1611197.3, 3 pages.

Wu, Haitao et al., "MDCube: A High Performance Network Structure for Modular Data Center Interconnection", ACM, CoNEXT'09, Dec. 1-4, 2009, Rome, Italy.

Zahavi, Eitan et al., "Quasi Fat Trees for HPC Clouds and their Fault-Resilient Closed-Form Routing", HOTI 2014, pp. 1-21.

Zahavi, Eitan, "Fat-tree routing and node ordering providing contention free traffic for MPI global collectives", Journal of Parallel and Distributed Computing, 2012, pp. 1-10.

Chinese Notification of the First Office Action, for Patent Application No. 201680064566.8, dated Jun. 24, 2019, 12 pages.

Partial English translation of the Chinese Notification of the First Office Action, for Patent Application No. 201680064566.8, dated Jun. 24, 2019, 16 pages.

\* cited by examiner $$C = \left\lfloor \frac{R_1}{L+1} \right\rfloor$$

$$F = LC = L \left\lfloor \frac{R_1}{L+1} \right\rfloor$$

$$U = R_1 - C - F$$

$$N = C(R_1 R_2)^L$$

$$P_1 = (R_1 R_2)^L$$

$$P_2 = LCR_1^{L-1} R_2^L$$

$$P_3 = 2LCR_1^L R_2^{L-1}$$

$$D = 2L$$

$$B = 1$$

Fig. 12 ic SWITCH

CROSS-REFERENCE TO RELATED APPLICATION(S)

This application is (a) a continuation of International Application Number PCT/EP2016/076756, filed on Nov. 4, 2016, which claims priority to (i) U.S. Provisional Patent Application No. 62/251,572, filed on Nov. 5, 2015, (ii) U.S. patent application Ser. No. 15/072,314, filed on Mar. 16, 2016, which claims the benefit of U.S. Provisional Patent Application No. 62/251,572, filed on Nov. 5, 2015 (iii) U.S. Provisional Patent Application No. 62/309,425, filed on Mar. 16, 2016, (iv) International Patent Application Number PCT/GB2016/051127, filed on Apr. 22, 2016, which claims priority to U.S. Provisional Patent Application No. 62/152,696, filed on Apr. 24, 2015, U.S. Provisional Patent Application No. 62/234,454, filed on Sep. 29, 2015, U.S. Provisional Patent Application No. 62/251,572, filed on Nov. 5, 2015, and U.S. patent application Ser. No. 15/072,314, filed on Mar. 16, 2016, which claims the benefit of U.S. Provisional Patent Application No. 62/251,572, filed on Nov. 5, 2015, (v) U.S. Provisional Patent Application No. 62/354,600, filed on Jun. 24, 2016, (vi) United Kingdom Patent Application Number GB 1611197.3, filed on Jun. 28, 2016, which claims priority to U.S. Provisional Patent Application No. 62/251,572, filed on Nov. 5, 2015, and U.S. patent application Ser. No. 15/072,314, filed on Mar. 16, 2016, which claims the benefit of U.S. Provisional Patent Application No. 62/251,572, filed on Nov. 5, 2015, and (vii) United Kingdom Patent Application Number GB 1611433.2, filed on Jun. 30, 2016, which claims priority to U.S. Provisional Patent Application No. 62/251,572, filed on Nov. 5, 2015, U.S. patent application Ser. No. 15/072,314, filed on Mar. 16, 2016, which claims the benefit of U.S. Provisional Patent Application No. 62/251,572, filed on Nov. 5, 2015, U.S. Provisional Patent Application No. 62/309,425, filed on Mar. 16, 2016, U.S. Provisional Patent Application No. 62/354,600, filed on Jun. 24, 2016, and International Patent Application Number PCT/GB2016/051127, filed on Apr. 22, 2016, and (b) a continuation-in-part of International Patent Application Number PCT/GB2016/051127, filed on Apr. 22, 2016, which claims priority to U.S. Provisional Patent Application No. 62/152,696, filed on Apr. 24, 2015, U.S. Provisional Patent Application No. 62/234,454, filed on Sep. 29, 2015, U.S. Provisional Patent Application No. 62/251,572, filed on Nov. 5, 2015, and U.S. patent application Ser. No. 15/072,314, filed on Mar. 16, 2016, which claims the benefit of U.S. Provisional Patent Application No. 62/251,572, filed on Nov. 5, 2015; the entire contents of all documents identified in this paragraph are hereby incorporated herein by reference as if fully set forth herein.

FIELD

One or more aspects of embodiments according to the present invention relate to optoelectronic switches, and more particularly to multi-dimensional optoelectronic switches and switching elements used therein.

BACKGROUND

The present and continuing increase in data traffic volumes and the requirement for speed of switching and reduced energy consumption in datacenters has driven a great deal of recent innovation. In particular, it has been realized that optical switching offers many of the desired properties but optical devices need to be controlled by and interfaced with electronic devices including traditional electronic data servers.

Optical devices themselves do not necessarily reduce the size or complexity of a switch. In order to improve flexibility in the assembly and application of optical switching units it is desirable to improve the scalability of an optical switch. One way of doing this relates to the topology of the components within the switch network. It is desirable to produce a highly scalable optical switching unit. Thus, there remains a requirement for a packet switch optimally benefiting from the speed of optics and the flexibility of CMOS electronics assembled in an architecture appropriate for huge scalability.

SUMMARY

At a high level, the gross structure of the present invention involves an array of leaf switches (which are client-side switches, to which input devices and output devices can be connected) which includes a number of sub-arrays, each associated with a different dimension, and wherein switching can occur within a given sub-array in the "direction" of that dimension, via a spine switch (which are fabric-side switches, with no external connections). To most easily understand how a signal may be switched from a source leaf switch to a destination leaf switch, consider a two-dimensional array, in which the source leaf switch and the destination leaf switch are located in different rows (which are sub-arrays associated with the "horizontal" dimension) and columns (which are sub-arrays associated with the "vertical" dimension). The signal will then be switched in two hops: a first hop takes the signal from the source leaf switch to another intermediate leaf switch in the same row, which is in the same column as the destination leaf switch. Then, in a second hop, the signal is switched along the column from the intermediate leaf switch to the destination leaf switch. Thus, it can be seen that when the optoelectronic switch is extended to L dimensions, the signal (which may be a packet of data, for example) can be switched from any source leaf switch to any destination leaf switch in a maximum of L hops, each hop confined to a single sub-array.

It is desirable for an optoelectronic switch such as this to cater for as many external devices as possible. There are two main ways in which this may be achieved. The first is to increase the number of dimensions in the array, and the second is to increase the size $R_i$ of the dimensions. Increasing the number of dimensions necessarily requires the inclusion of larger leaf switches, in order to cater for switching in more than one dimension. Increasing the sizes $R_i$ of the dimensions may mean that the spine switches, which are used to control the switching from, e.g., a source leaf switch to an intermediate leaf switch within a given dimension, need to have a large radix in order to accommodate for switching between all of the leaf switches in that sub-array, preferably in a non-blocking fashion and to preserve bisection bandwidth. In the present invention, additional switching elements are included in each sub-array, and more specifically, a first aspect of the present invention provides an L-dimensional optoelectronic switch for transferring an optical signal from an input device to an output device, the optoelectronic switch including:

a plurality of leaf switches, each having a radix R, and arranged in an L-dimensional array, in which each dimension i has a respective size $R_i$ (i=1, 2, ..., L), each leaf switch having an associated L-tuple of co-ordinates $(x_1, \ldots, x_L)$ giving its location with respect to each of the L dimensions;

wherein each leaf switch is a member of L sub-arrays, each of the L sub-arrays associated with a different one of the L dimensions, and including:

a plurality of $R_i$ leaf switches, whose co-ordinates differ only in respect of the $i^{th}$ dimension, each leaf switch having C client ports for connecting to an input device or an output device, and F fabric ports for connecting to spine switches;

a plurality of $S_i$ spine switches, each having R fabric ports for connecting to the fabric ports of the leaf switches, and wherein, in a given sub-array each leaf switch in the sub-array is connected to each spine switch via an optical active switch.

Insertion of optical active switches in between the leaf switches and spine switches means that fewer spine switches can be used to provide switching between the same number of leaf switches. Accordingly, in preferred embodiments of the present invention, in a given sub-array, the number of leaf switches is greater than the number of spine switches. There may be more leaf switches, in a given sub-array, than the number of fabric ports per spine switch. This can be understood from a consideration of the radix R, which is the same for both the leaf switches and the spine switches. In embodiments of the invention in which L>1, the leaf switch requires at least one fabric port for switching in each dimension, and accordingly, there are fewer fabric ports available for switching within any given sub-array. In a sub-array, the fabric ports on the spine switches are concerned only with switching in the dimension associated with that sub-array. Therefore, in a balanced network, fewer spine switches are able to support more leaf switches by virtue of the multidimensional nature of the optoelectronic switch. In preferred embodiments, L is equal to two or more, and may take any of the following values: 2, 3, 4, 5, 6, 7, 8, 9, 10.

In embodiments of the present invention, switching is provided between leaf switches within a given sub-array by spine switches, which may be electronic packet switches, and may be referred to as EPSs or AOBMs. It should also be noted that throughout this application, leaf switches may be referred to as "optical packet processing modules" or "OPPMs".

In order to appreciate the advantageous effects of the present invention, consider a sub-array in which the spine switches are connected only via a single spine switch, or a band of parallel spine switches (by "parallel", we mean that the spine switches are each connected only to leaf switches, and not to other spine switches). It is necessary for each of these spine switches to have a connection to every leaf switch in the sub-array in question, and each leaf switch must be connected to every spine switch, otherwise it may not be possible to provide connectivity between every leaf switch with every other leaf switch in the sub-array.

So, as mentioned above, for large sub-arrays, large numbers of large radix spine switches are required. It is still necessary for every leaf switch to have a connection to every spine switch, but in the present invention, the leaf switches are connected to the spine switches via an optical active switch. Herein, an "active switch" is a switch wherein the path of a signal through that switch, e.g., from which input to which output, can be actively controlled, and varied, in effect providing full-mesh capability without the need for a full mesh of links within the switch. The optical active switch may be an optical circuit switch or OCS (the terms being used interchangeably herein. More specifically, each optical active switch may have a plurality of inputs and a plurality of outputs, the number of inputs being the same as the number of outputs. The "radix" of the optical active switches refers to the number of inputs or the number of outputs, and not to the total number of inputs and outputs. Accordingly, outputs of a given optical active switch may be connected to a plurality or set of spine switches in the sub-array. A given leaf switch may be connected to a cluster of optical active switches, each connected to a set of spine switches. More specifically, each of the cluster of optical active switches to which a given leaf switch is connected may be connected to different, disjoint sets of spine switches (by "disjoint", we mean that no two optical switches in a given cluster are connected to the same spine switch, i.e., the sets of spine switches have no overlap).

In this way, the leaf switch in question is connected to all of the spine switches in the sub-array, but via a smaller radix optical active switch. Because the optical active switches also have a plurality of inputs, these inputs can be shared between a plurality of leaf switches. In other words, for a given cluster of optical switches (the outputs of which provide connections to all spine switches in the sub-array), each input of each optical active switch in the cluster may be connected to a respective (i.e., different) leaf switch. Thus, the leaf switches may be divided into a plurality of clusters, and in particular: in a given sub-array the leaf switches may be divided into a plurality of clusters, the clusters each containing a plurality of leaf switches. Each cluster may have its own associated cluster of optical active switches, the optical active switches providing connectivity between each of the cluster of leaf switches and each of the spine switches in the array, via the cluster of optical active switches. In other words each cluster of leaf switches may be associated with a cluster of one or more fabric-entry optical active switches to form a line card assembly, each leaf switch in the cluster may be connected to each fabric-entry optical active switch in the line card assembly, and the fabric-entry optical switches may be arranged so that optical signals pass through said fabric-entry optical active switches during transfer from a leaf switch to a spine switch.

Optionally, in a given sub-array each spine switch may be connected to a fabric-entry optical active switch in a line card assembly located in that sub-array, and no more than one fabric-entry optical active switch in that line card assembly is connected to a given spine switch. Within a line card assembly, there may be L distinct sets of fabric-entry optical active switches, each set configured to transfer optical signals within a respective sub-array containing that line card assembly, each of those sub-arrays associated with a respective one of the L dimensions.

In order to maximize topological regularity, it is preferable that all, or substantially all of the optical active switches which are employed in embodiments of the present invention have the same radix, or more specifically the same number of inputs and outputs. In particular, when all of the optical active switches in a given sub-array have a given radix, it is possible for the same number of spine switches to support, without prejudice to the bisection bandwidth, a number of leaf switches which is increased by a factor of that radix. For example, if optical active switches of radix 3 are used, the sub-arrays may be three times the size. In other words, the opportunities for upscaling the array are greatly increased, without the need to increase the size of the spine switches which are employed.

The connections described above are concerned with the transmission of a signal from an output of a leaf switch, to an input of a spine switch. In order to complete the transfer of the signal from one leaf switch in the sub-array to another leaf switch in the sub-array, it must be sent from an output of the spine switch to a fabric port on the destination (or intermediate) leaf switch. Therefore, in some embodiments, this transmission also takes place via an optical active switch. Accordingly, each leaf switch in the sub-array may be connected to a second, or "fabric-exit" cluster of optical active switches. For clarity, the arrangements described in the previous paragraph are referred to henceforth as "fabric-entry" clusters of optical active switches. Simply put, the fabric exit clusters, have a mirror image configuration to the fabric entry clusters. In other words, the inputs of a given optical active switch in a fabric exit cluster are respectively connected to outputs of a set of spine switches, and the inputs each optical active switch in the cluster are connected to the outputs of different, disjoint sets of spine switches. Then, each of the outputs of a given optical active switches in the fabric exit cluster are connected to the fabric ports of each of the leaf switches in the cluster of leaf switches which are associated with that fabric exit cluster, and accordingly each of the fabric ports on a given leaf switch in the cluster is connected to a different optical active switch within the fabric exit cluster associated with that cluster of leaf switches. Other clusters of leaf switches may be defined, e.g., there may be clusters containing one leaf switch from each fabric-entry cluster.

Each cluster of leaf switches may be further associated with a cluster of one or more fabric-exit optical active switches to form a fabric-exit arrangement, each leaf switch in a given cluster may be connected to each fabric-exit optical active switch in the fabric-exit arrangement, and the fabric-exit optical active switches may be arranged so that optical signals pass through said fabric-exit optical active switches during transfer from a spine switch to a leaf switch. Each spine switch may be connected to a fabric-exit optical active switch in a fabric-exit arrangement located in that sub-array, and no more than one fabric-exit optical active switch in that fabric-exit arrangement is connected to a given spine switch.

When the leaf switches, optical active switches and spine switches as described above, within a given sub-array the leaf switches are effectively connected via a five-stage Clos network, i.e., leaf switch (fabric entry) optical active switch spine switch (fabric exit) optical active switch leaf switch. As will be apparent from the description above, the fabric entry optical active switches are different entities from the fabric exit optical active switches, but there are only one set of leaf switches. This network is therefore best represented (as will be seen in more detail later in the application) as an unfolded Clos network, though strictly speaking it may be considered a partially-folded Clos network. Use of a Clos, or partially-folded Clos network such as this means that it is possible to accommodate for any combination of one-to-one pairings between the $R_i$ leaf switches in the sub-array, in a non-blocking fashion.

The arrangement described in the preceding paragraphs need not be employed for switching in all L dimensions. In some embodiments of the present invention, each leaf switch in a given sub-array may be connected to each spine switch via an optical active switch only in respect of sub-arrays associated with M dimensions, where M<L. The other optional features presented above may apply to any or all of the dimensions in which switching between leaf switches goes via an optical active switch.

The optoelectronic switch according to the first aspect of the invention may be arranged on an optical backplane.

Accordingly, the constituent components (i.e., the leaf switches, the optical active switches, and the spine switches) may be located on cards. A card may be a printed circuit board onto which electronic components, optical components and the control components (i.e., arbiters) are formed. A card may also house the optical and electronic components therebetween. In particular, embodiments of the invention may include two types of card: line cards and fabric cards. More specifically, the components may be located on either line cards or fabric cards. Line cards are "client-facing" cards, and fabric cards are "fabric-facing" cards.

Leaf switches and fabric-entry optical active switches, i.e., line card assemblies may be located on respective line cards. More specifically, a single line card includes at least one leaf switch and at least one fabric-entry optical active switch. In some embodiments, a single line card may include a plurality of leaf switches and/or a plurality of fabric-entry optical active switches. In embodiments in which there are clusters of leaf switches, and associated clusters of fabric-entry optical active switches, a cluster of leaf switches and its associated cluster of fabric-entry optical active switches are preferably mounted on the same line card. In N-dimensional embodiments of the present invention, each leaf switch is a member of N sub-arrays, as discussed earlier in the application.

In embodiments in which there are clusters of leaf switches and fabric-entry clusters of optical active switches, each cluster of leaf switches and its associated cluster of fabric-entry optical switches may be located on their own line card. In a given sub-array, the spine switches and fabric-exit optical switches may be located on a fabric card. The fabric card may also include an arbiter for controlling the path of a signal through a fabric-exit optical active switch located on that fabric card. The fabric card may also include a plurality of arbiters, each configured to control the path of a signal through a respective fabric-exit optical active switch on the fabric card. Not all of the spines need to be on the same fabric card. However, it is advantageous to package them such that the fabric-exit OCS connected to the same spine are all packaged on the same card as that spine. In practice, this means that clusters of spines and fabric-exit OCS are packaged on the same card (in a way that is analogous to the leaves and fabric-entry OCS).

There are two elements of control in the optoelectronic switch of the present invention: routing/load balancing, and arbitration.

The packet processor makes a routing decision based on the destination address of the packet and on the current location. On the path from leaf to spine, the routing decision selects a spine to route to (generally attempting to balance the load across the available spines), which in turn determines a specific output port on both the local leaf switch and the fabric-entry optical active switch. The output identifier of the fabric-entry optical active switch is communicated to the arbiter, so that it can determine which of its inputs need to be connected to which of its outputs. On the path from spine to leaf, the routing decision selects the appropriate leaf according to the packet's destination, which in turn determines the local output port on the spine and the fabric-exit optical active switch.

Arbitration is performed by arbiters, and is the process by which it is determined which path a signal should take through an optical active switch, i.e., from which input to which output, in order to ensure that all of the signals incident upon that optical active switch are directed towards the correct next switching element (which may be a spine switch or a leaf switch, depending on which "stage" the signal is at). Thus, in some embodiments, there may be an arbiter associated with each optical active switch in a given sub-array, in other words, the line card may include an arbiter for controlling the path of a signal through a fabric-entry optical active switch included in the line card assembly located on that line card, or there may be a plurality of arbiters, each configured to control the path of a signal through a respective fabric-entry optical active switch. Alternatively, since the optical active switches may have a small radix (e.g., 2, 3, 4, 5, 6, 7 or 8), the arbitration process is relatively simple (e.g., as compared to a radix 24 switching element), and so a plurality of arbiters may be combined into a single arbitration component, which may be an ASIC. In some embodiments, there may be a single arbiter, or a single arbitration component as described above on each line card. In the embodiments described in this paragraph, the control performed by the arbiters is constrained within the boundaries of the line card in question. This minimizes latency and synchronization issues associated with the control plane: the distances/flight times on the card can be controlled to far tighter tolerances within the physical dimensions of a single card that across cards that may be located at a substantial distance from each other. Furthermore, by having several arbiters, each associated with a small number (e.g., one) of optical active switches, a large number of small problems may be solved swiftly and in parallel, as opposed to having to centrally solve a more complex problem relatively slowly.

Broadly speaking, the optical active switches are controlled by an arbiter, configured to control the action of at least one of the optical active switches and spine switches within a given sub-array, based on the destination information stored in the packets of data to be switched. This then allows the provision of a route which ensures that all data reaches the appropriate leaf switch in a non-blocking fashion, and which minimizes the occurrence of bottlenecks. The packet processors in the leaf switches may each be connected to an arbiter. When a packet of data is received at the transmission side packet processor, it may send a request to the arbiter to which that packet processor is connected, the request preferably identifying the destination leaf switch, or alternatively identifying the next leaf switch to which the packet of data should be sent (which may be the destination leaf switch). The arbiter is then able to establish a scheme which ensures that to the greatest extent possible, each packet is able to perform its next hop. The structure of the leaf switches is described in more detail below.

The arbiters may be connected to other components such as packet processors and optical active switches using dedicated control channels. They may also be connected to a driver chip, which is configured to control the action of the optical active switches.

A second aspect of the present invention provides a leaf switch which may be used in an optoelectronic switch according to the first aspect of the invention. In particular, the leaf switch may include:

a client port for connecting to an input device or an output device and a client portion connected to the client port;

a first fabric portion and a second fabric portion, connected respectively to a first fabric port and a second fabric port for processing signals and communicating with spine switches or optical active switches, the first fabric portion having a transmission side and a receiving side, wherein the transmission side includes:

a transmission side input for receiving a first electronic signal carrying information including information about a destination leaf switch of the first electronic signal, the first electronic signal being received from either:

an output of the second fabric portion, or an input device, via the client portion and the client port;

a modulator for converting said first electronic signal into a first plurality of optical signals containing the same information;

a transmission side multiplexer for converting the first plurality of optical signals into a multiplexed fabric output signal for transmission to an input of an optical active switch;

wherein the receiving side includes:

a receiving side demultiplexer for receiving a multiplexed fabric input signal from an output of an optical active switch, and converting said multiplexed fabric input signal into a second plurality of optical signals;

a photodetector for converting said second plurality of optical signals into a second electronic signal; and a receiving side output for sending the second electronic signal to either:

a transmission side input of the second fabric portion, or an output device, via the client portion and the client port.

It should be noted that the term "port" in the above need not necessarily refer to a physical hole, or socket. Rather, the "client port" and "fabric port" of the leaf switches refer to the regions of the leaf switch which are responsible for preparation or processing of signals which are to be sent to/received from the clients and fabric respectively. Leaf switches according to the second aspect of the invention are able to act as intermediate leaf switches, since the second electronic signal may be sent to another fabric port (which may also be referred to herein as a "fabric portion") for retransmission along a different dimension, or to a client port, for transmission to an output device. The second fabric port is therefore preferably able to perform the same functions as the first fabric portion, and have equivalent features. The second fabric port may be substantially identical to the first.

Leaf switches according to the second aspect of the invention provide the functionality required to construct the scalable, multi-dimensional optoelectronic switches of the first aspect of the invention. Due to modulation of the first electronic signal, the majority of data transfer is able to take place in the optical domain, rather than the electronic domain. This means that data can be transmitted at high data rates, and over long distances, at a lower power and with lower power loss than would be the case in the electronic domain. Additionally, the use of the optical domain enables wavelength division multiplexing (WDM) to be used. A further important advantage is bit-rate independence, wherein switch plane data operates at packet- and not bit-rate.

The transmission side of each leaf switch preferably includes a transmission side packet processor, which is configured to receive the first electronic signal in the form of a packet, having a packet header containing the destination information. In additional to the data itself, the information included in the packet may include information relating to the destination of that packet, e.g., the client port/destination leaf switch. The packet header may include further various pieces of information, including source and destination address, packet length, protocol version, sequence number, payload type, hop count, quality-of-service indicator, and others.

The transmission side packet processor may be configured to perform packet fragmentation, wherein packets of data having the same destination leaf switch are arranged into frames having a predetermined size, and wherein the packets of data may be split up into a plurality of packet fragments, arranged in a corresponding plurality of frames, and wherein one frame may contain data from one or more packets of data. Each packet fragment may have a packet fragment header, including information at least identifying the packet to which that packet fragment originally belonged, so that the packet may be reconstructed after subsequent processing and transmission.

For example, consider the case where the packet processor is configured so that the frame payload size is 1000B, and three packets of 400B, 800B and 800B are input into the leaf switch. If each of these were to be sent in separate frames, of one packet each, this would represent an efficiency of (400+800+800)/3000=67%. However, by using packet fragmentation, a first frame may include the 400B packet, and 200B of the first 800B packet, and then a second frame may include the second 800B packet and the remaining 200B of the first 800B packet. This leads to an efficiency of 100%. The frames that are constructed by this process represent packets of data in their own right, and so further fragmentation may occur at intermediate leaf switches, when the packet undergoes more than one hop in order to reach the destination leaf switch. It should be noted, that even when a signal passes through a spine switch and two optical active switches in order to reach an intermediate leaf switch, this is still only a single hop. In other words, a hop may be defined as a transfer of a signal from one leaf switch to another.

In order to maximize efficiency, subsequent processing of a frame (e.g., forwarding said frame to be converted into the first plurality of optical signals) may not occur until the filling proportion of a frame reaches a predetermined threshold, preferably more than 80%, more preferably more than 90%, and most preferably 100%. The packets may alternatively be sent for subsequent processing after a predetermined amount of time has elapsed. In this way, if packets of data for a given leaf switch cease to arrive at the packet processor, a frame which is still below the threshold filling proportion may still be sent for subsequent processing rather than lying stagnant on the packet processor. The predetermined amount of time may be between 50 and 1000 ns, but is preferably between 50 and 200 ns. Most preferably, the time interval is around approximately 100 ns. Accordingly, the transmission side packet processor may include or be associated with a transmission side memory in which to temporarily store incomplete frames during their construction. The elapsed time may be varied depending upon traffic demand; typically, the higher the rate of traffic flow, the shorter will be the elapsed time and lower rates of traffic flow may lead to increased time intervals.

When the packet processor is configured to perform packet fragmentation, the receiving side may also include a receiving side packet processor, which is configured to recreate the original packets from the packet fragments, when the original packets are spread over more than one frame. This may be done with reference to the packet fragment headers described above. When a packet undergoes several separate fragmentations by successive intermediate leaf switches on its journey from source to destination, final reassembly of the packet by the receiving side packet processor may be delayed until all of the constituent parts of the original packet have arrived at the destination leaf switch. Accordingly, the receiving side packet processor may include or be associated with a receiving side memory in order to temporarily store the constituent parts.

The transmission side may include a plurality of modulators, preferably optical modulators. The optical modulators may be phase or intensity modulators, for example electro-absorption modulators (EAMs), Franz-Keldysh modulators, modulators based upon the quantum confined Stark Effect, Mach-Zehnder modulators, and the plurality of modulators preferably includes 8 modulators. Each modulator may be associated with a single light source only or may be lit by fewer light sources, where the light sources are shared between modulators. Each modulator may be configured to receive an electronic signal from the input or the transmission side packet processor, and unmodulated light from the light source. By combining the two, the modulator generates a modulated optical signal having the same wavelength as the unmodulated light from the light source, and carrying the information carried by the original (first) electronic signal. This modulated optical signal may then be transmitted to the transmission side multiplexer. The light source is preferably in the form of a laser, in order to generate a substantially monochromatic beam of light restricted to a narrow band of wavelengths. In order to minimize losses, the modulators are preferably configured to receive light having a wavelength in the C-band or L-band of the electromagnetic spectrum, i.e., from 1530 nm to 1625 nm. More preferably, the light has a wavelength falling within the C-band or "erbium window", having a wavelength from 1530 nm to 1565 nm.

The laser may either be a fixed-wavelength laser or a tunable laser. In an array of modulators, the light source associated with each modulator should have a different wavelength, with non-overlapping bandwidths, in order to minimize crosstalk in the multiplexer. When the light source is a laser, the modulator may be in the form of an electro-absorption modulator (EAM), which uses a changing electric voltage to modulate the intensity of the laser light to carry the information contained in an electronic signal. Using an EAM means that only the intensity of the laser light is changed, rather than the frequency, and thus prevents any change in the wavelength of the modulated optical signal.

In embodiments in which the leaf switch includes a plurality of modulators, the transmission side packet processor may also be configured to perform packet slicing, wherein a frame (as constructed by the packet fragmentation process described above) or a packet of data is sliced into a first plurality of electronic signals. Each of the first plurality of electronic signals may then be sent to a different modulator in the plurality of modulators, whereby they are converted into the first plurality of optical signals. The photodetector, which may be a photodiode, may convert the second plurality of optical signals into a second plurality of electronic signals. More preferably, the receiving side may include a plurality of photodetectors, which may be identical to each other or substantially identical to each other. The receiving side packet processor may be configured to recombine the second plurality of electronic signals, which represent packet slices, into the second electronic signal. By dividing the packet or frame into a plurality of slices before sending to another leaf switch, the data can be sent using a number of different wavelengths which are multiplexed into a single optical link by the multiplexer. In this way, several pieces of information can be sent in parallel, and leads to increased bandwidth and more efficient data transfer.

In the event where the transmission side packet processor is configured to perform both packet slicing and packet fragmentation, the packet fragmentation step (i.e., the formation of frames of data) occurs first, followed by slicing of the frame. Correspondingly, on the destination (or intermediate) leaf switch which receives the signal, the packet processor recombines the second plurality of electronic signals (i.e., packet slices) into a single second electronic signal before the original packets are reconstructed from the frames.

After fragmentation, frames are constructed which each contain data having intended only for a single leaf switch, by which we mean the next leaf switch in the overall transfer, and not necessarily the final destination leaf switch. After this, data is converted into the first plurality of optical signals each differing in wavelength, it is multiplexed, specifically wavelength division multiplexed, by the transmission side multiplexer to form the multiplexed fabric output signal. Preferably, the leaf switch is configured to operate in burst mode, wherein the leaf switch is configured to send the multiplexed fabric output signal a series of successive bursts, each burst including packets and/or packet fragments from a single frame of data, and such that each burst includes only packets and/or packet fragments which are to be sent to a single leaf switch in their next hop. Each successive burst may comprise a frame of data to be sent to a different single leaf switch in their next hop. Pairs of sequential bursts may be separated by a predetermined time interval, which may be between 50 and 1000 ns, but is preferably between 50 and 200 ns. Most preferably, the time interval is around approximately 100 ns. Preferably, all of the fabric ports which are connected to the active switch in a single sub-array are configured to operate synchronously, i.e., each fabric port sends a burst to an input of an optical active switch at the same time. In this way, the optical active switch can route each signal to a given spine switch in one switching action.

The transmission side packet processor may also be configured to carry out error correction on incoming packets of data. This may be done by means such as error detection and retransmission or forward error correction (FEC). Additionally, the leaf switch may also include a management port, which is configured to perform fabric management processes including initialization, programming routing/forwarding tables, fault reporting, diagnostics, statistics reporting and metering.

When it is necessary for a packet to perform more than one hop in order to reach its destination leaf switch, the route may be deduced entirely from a comparison between the coordinates of the source leaf switch and the destination leaf switch. For example, in a process known as dimension ordered routing, the first hop may match the first coordinate of the source and destination leaf switches, the second hop may match the second coordinate of the source and destination leaf switches and so on, until all of the coordinates match, i.e., until the packet has been transferred to the destination leaf switch. For example, in a four-dimensional network, if the source leaf switch were to have coordinates (a, b, c, d) and the destination leaf switch were to have coordinates (w, x, y, z), then the dimension-ordered route might be: (a, b, c, d)→(w, b, c, d)→(w, x, c, d)→(w, x, y, d)→(w, x, y, z). At any point along the route, the packet processor may compare the coordinates of the source leaf switch against the coordinates of the destination leaf switch, and determine which coordinates do not yet match. Then it will decide to route along the non-matching directions, e.g., with the lowest index, or the highest index.

The optical active switches or optical circuit switches of the present invention may be based on an arrangement of Mach-Zehnder interferometers (MZIs) and more specifically may be in the form of an MZI cascade switch. An MZI cascade switch includes a plurality of MZIs, each having two arms which split at an input coupler, with two arms feeding the split paths into an output coupler where they are recombined, and two output portions. The plurality of MZIs are preferably arranged to provide a pathway from each input to each output of the MZI cascade switch. To the greatest extent possible the arms have the same length. Alternatively, where it is desirable to have a default output, the arms may be unbalanced. Each MZI may include an electro-optical region at one or both arms, in which the refractive index depends on a voltage applied to the region via one or more electrodes. The phase difference of light travelling through the electro-optical region can therefore be controlled by application of a bias via the electrodes. By adjusting the phase difference, and therefore the resulting interference at the output couple, the light can be switched from one output of the MZI to the other.

Consider the case where each optical active switch has $K_i$ inputs and $K_i$ outputs, which may be made up, for example, of a plurality of 1×2 and 2×1 MZIs, arranged to provide a pathway from each input to each output. A MZI cascade switch is beneficial over a full mesh for connecting $K_i$ inputs to $K_i$ outputs when $K_i$ is 5 or more, since a full mesh requires $\frac{1}{2}K_i(K_i+1)$ optical fibers to connect all of the inputs to all of the outputs, whereas an MZI cascade switch requires only $2K_i$ optical fibers. It is possible to create an MZI cascade switch with $K_i=2n$ inputs and outputs by building $K_i$ "1×$K_L$ demux trees" and $K_i$ "$K_i$×1 mux trees", wherein each tree includes n stages of 1×2 (demux) or 2×1 (mux) switches, with 2k switches at the $k^{th}$ stage. An additional port may be supported on each cascade switch by building ($K_i$+1) trees on each side and omitting an internal connection so that an input is not connected to the output which is connected to the same switch as itself. An MZI cascade switch such as this is largely wavelength-agnostic, and so is able to switch the whole multiplexed fabric output signal from input to output without first requiring any demultiplexing/multiplexing at the inputs and outputs.

The spine switches may be electronic active switches or electronic packet switches, such as electronic crossbar switches. Preferably, the spine switches may be an electronic shared memory switch. An electronic shared memory switch is an electronic crossbar switch which also includes a memory. The presence of a memory within the switch is advantageous since it means that the switch can perform not only switching, but also buffering, i.e., storing a queue of packets when a bottleneck arises at the electronic shared memory switch, as described above. This means that the electronics on the packet processors on the leaf switches can be simplified.

In preferred embodiments of the present invention, for ease of manufacture, each of the spine switches may contain the same components as each of the leaf switches. In other words, all of the leaf switches and spine switches may be identical or substantially identical to each other. In this way, optoelectronic switches according to the present invention may be constructed by assembling a set of identical or substantially identical elements, and then the functionalities of these elements may be controlled using software, for example. Spine switches are entirely "fabric-facing", i.e., they do not connect to external devices, and accordingly they have no client ports or client portions. However, it must be stressed that the physical structure of the switching element is identical to that of a leaf switch, it is merely the use or functionality of the various (identical) components which may differ. Accordingly, a spine switch may include:

a first fabric portion and a second fabric portion, connected respectively to a first fabric port and a second fabric port for processing signals and communicating with leaf switches or optical active switches, the first fabric portion having a transmission side and a receiving side,
  wherein the transmission side includes:
    a transmission side input for receiving a first electronic signal carrying information including information about a destination leaf switch of the first electronic signal, the first electronic signal being received from an output of the second fabric portion;
    a modulator for converting said first electronic signal into a first plurality of optical signals containing the same information;
    a transmission side multiplexer for converting the first plurality of optical signals into a multiplexed fabric output signal for transmission to an input of an optical active switch;
  wherein the receiving side includes:
    a receiving side demultiplexer for receiving a multiplexed fabric input signal from an output of an optical active switch, and converting said multiplexed fabric input signal into a second plurality of optical signals;
    a photodetector for converting said second plurality of optical signals into a second electronic signal; and
    a receiving side output for sending the second electronic signal to a transmission side input of the second fabric portion.

The optional features set out above with reference to the leaf switches apply equally to the spine switches, where compatible.

As discussed above, the spine switches may be electronic switches of some kind. Since the outputs from the optical active are optical signals, these must be converted into electronic signals, which are then switched using the spine switches. Accordingly, an optical-to-electronic (herein "O/E") converter may be located at the inputs, and preferably at every input, of the spine switches in the sub-array, for converting signals from, e.g., the fabric entry clusters of optical active switches. Similarly, in those embodiments having a second set of optical active switches, e.g., in fabric exit clusters, electronic-to-optical (herein "E/O") converters may be located at the outputs, and preferably at every output, of the spine switches. Between these O/E and E/O conversions, the signal may be switched in the form of an electronic switching signal. It is preferable to have the O/E and E/O converters at the spine switch, rather than at the optical active switches because, as discussed earlier, it is advantageous for the signals to be conveyed optically, rather than electronically. The O/E converter may include a photodetector or plurality of photodetectors, each of the plurality of photodetectors corresponding to an input of the spine switch.

In embodiments employing wavelength division multiplexing, before the signal can be switched electronically, it may be necessary first to demultiplex the signal. Accordingly, the O/E converter may include a demultiplexer for demultiplexing the multiplexed fabric output signal (into, e.g., a first plurality of optical switching signals) before converting the demultiplexed signals into electronic switching signal(s), whereupon they are switched by the spine switch. The E/O converter may then convert the switched electronic switching signal(s) into a corresponding second plurality of optical switching signals, which may then be multiplexed into a single signal to form the multiplexed fabric input signal, to be transmitted to an optical active switch. Accordingly, the E/O converter may also include a multiplexer. In preferred embodiments, the electronic active switch may be configured to temporarily store a queue of packets or frames of data when a request relating to said packets or frames cannot be met.

Any or all of the multiplexer, transmission side multiplexer, demultiplexer and receiving side demultiplexer is preferably in the form of an arrayed waveguide grating (AWG), which is a passive device. An AWG allows a plurality of optical signals of different wavelengths to be carried along a single optical fiber. Because the wavelengths of the plurality of modulated optical signals produced by the modulators are all different, the multiplexed fabric output signal produced by the AWG suffers from little to no crosstalk, since light of different wavelengths interferes only linearly. Alternatively, instead of an AWG, the multiplexed signal may be broadcast to a number of wavelength-selective filters, each tuned to receive a wavelength of one of the desired split signals.

An important consideration in switching systems such as the switch of the present invention is that of bandwidth. In the following discussion "bandwidth" is used to refer to the maximum rate of data transfer of which a particular portion is capable, and is typically measured in gigabits per second (herein abbreviated to "Gbps") Specifically, it is important to ensure that there is a conservation of bandwidth on both a local and global scale. In order to ensure that it is not possible for more data to enter a given leaf switch in a given time than can be transmitted away from that leaf switch in the same time (i.e., resulting in a bottleneck which is localized onto that leaf switch), the total bandwidth of the client ports on a leaf switch preferably does not exceed the total bandwidth of the fabric ports on the same leaf switch. More preferably, the total bandwidth of the fabric ports on a leaf switch exceeds the total bandwidth of the client ports on the same leaf switch, and most preferably, the bandwidth of each fabric port on a leaf switch exceeds, or is equal to, the total bandwidth of all of the client ports on that leaf switch. In this way, local bottlenecks caused by an unexpectedly large volume of incoming data from a plurality of client ports, all directed to the same fabric port on the same leaf switch, can be avoided. In particular, this allows all signals to be multiplexed together for subsequent transmission in a non-blocking fashion. In the embodiments of the invention described above, the leaf switches and spine switches are connected via optical active switches. However, it is also envisaged that rather than optical active switches being connected between the spine switches and leaf switches, other types of switches may be used. For example, these switches may be referred to as intermediate switches. These intermediate switches may be electronic active switches, such as electronic packet switches, and may have the same components as the electronic active switches described above, with reference to the spine switches. Of course, embodiments in which the intermediate switches are optical active switches have been discussed in detail above. In some embodiments, each of the intermediate switches may have the same components has each of the spine switches and/or leaf switches. In embodiments including these intermediate switches, the definitions of leaf switches and spine switches differ only in that "optical active switch" may be replaced by "intermediate switch". An intermediate switch may be defined as a switching element including:

a first fabric portion and a second fabric portion, connected respectively to a first fabric port and a second fabric port for processing signals and communicating with spine switches or leaf switches, the first fabric portion having a transmission side and a receiving side, wherein the transmission side includes:

a transmission side input for receiving a first electronic signal carrying information including information about a destination leaf switch of the first electronic signal, the first electronic signal being received from an output of the second fabric portion;

a modulator for converting said first electronic signal into a first plurality of optical signals containing the same information;

a transmission side multiplexer for converting the first plurality of optical signals into a multiplexed fabric output signal for transmission to an input of a spine switch or a leaf switch;

wherein the receiving side includes:

a receiving side demultiplexer for receiving a multiplexed fabric input signal from an output of a leaf switch or a spine switch, and converting said multiplexed fabric input signal into a second plurality of optical signals;

a photodetector for converting said second plurality of optical signals into a second electronic signal; and a receiving side output for sending the second electronic signal to a transmission side input of the second fabric portion.

All of the optional features which are set out above with respect to the spine and leaf switches may also apply to the intermediate switches. Furthermore, all of the optional features which are set out above with respect to optoelectronic switches including optical active switches may also apply to optoelectronic switches including intermediate switches.

Further optional features of the invention are described below, with reference to the accompanying drawings.

BRIEF DESCRIPTION OF THE DRAWINGS

These and other features and advantages of the present invention will be appreciated and understood with reference to the specification, claims, and appended drawings wherein:

FIG. 12 shows the relationships between various quantities and parameters of note in optoelectronic switches according to the present invention.

DETAILED DESCRIPTION

The detailed description set forth below in connection with the appended drawings is intended as a description of exemplary embodiments of an optoelectronic switch provided in accordance with the present invention and is not intended to represent the only forms in which the present invention may be constructed or utilized. The description sets forth the features of the present invention in connection with the illustrated embodiments. As denoted elsewhere herein, like element numbers are intended to indicate like elements or features.

Figure 1:
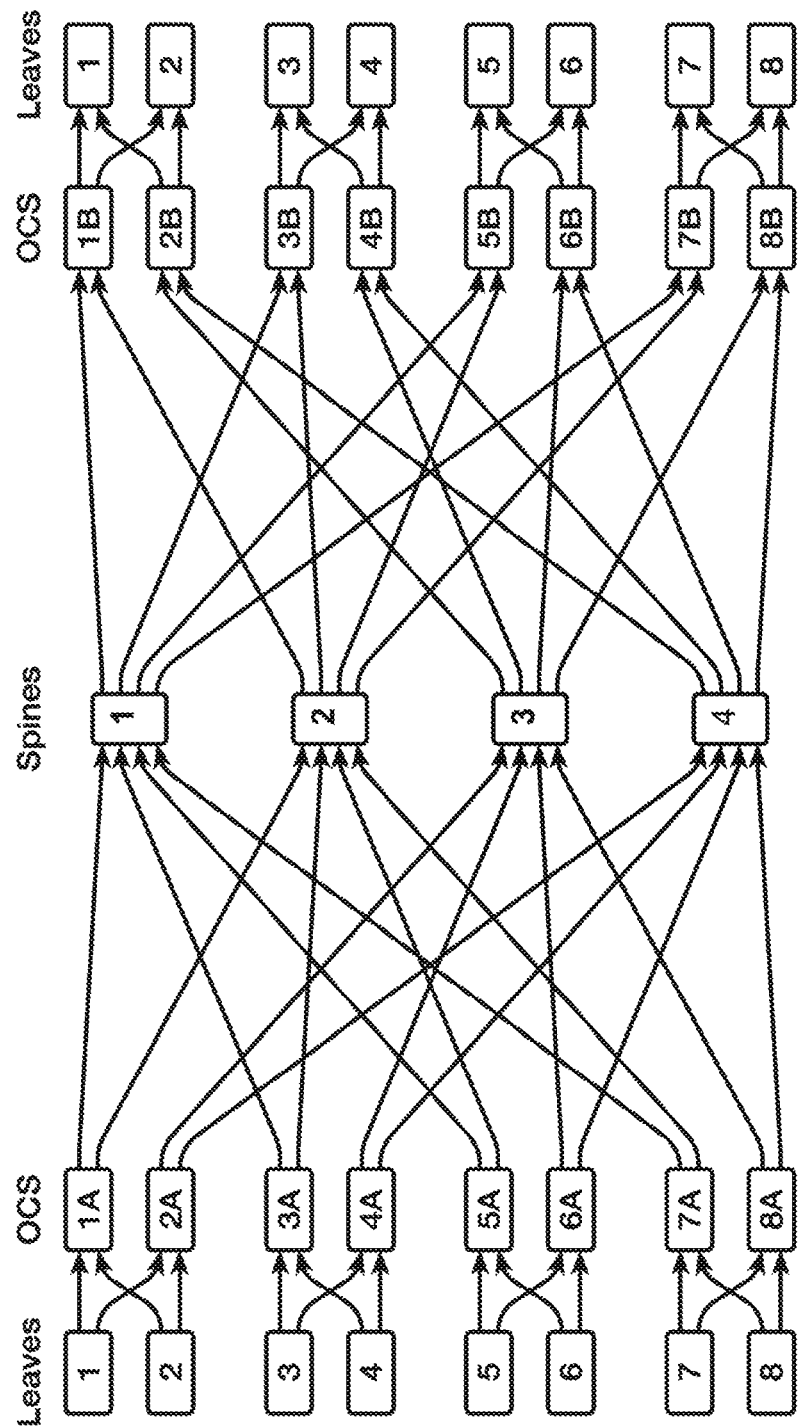
FIGS. 1 to 4 are schematic diagrams showing the connections between the leaf switches, spine switches and optical active switches in a given sub-array, according to three different embodiments of the present invention. The connections are only shown in a single dimension.

In an optoelectronic switch according to the present invention, the leaf switches in each sub-array are connected by spine switches and optical active switches. An example of the connections in a given sub-array is shown in FIG. 1, in which the radix of the leaf switches (i.e., fabric ports and client ports) and the spine switches (fabric ports only) is four, i.e., each has four inputs and four outputs. Here, it must be stressed that the eight leaf switches 1 to 8 on the left-hand side of the drawing are the same as the eight leaf switches 1 to 8 on the right-hand side of the drawing. They are each shown twice (i.e., in an "unfolded" configuration) because the connections are not bidirectional, and to show them in a "folded" configuration would be confusing. In this example, there are four spine switches, shown along the center of the drawing.

Most importantly for this invention, there are also a band of eight fabric-entry optical active switches 1A to 8A, which in this embodiment are optical circuit switches, and are herein referred to as "OCS", and a band of eight fabric-exit OCS 1B to 8B. All OCS have a radix of two. Unlike the leaf switches, OCS 1A to 8A are not the same as OCS 1B to 8B. When connected as shown in FIG. 1, the leaf switches, spine switches and OCS form a 5-tier Clos network, in which the five tiers are:

1. Leaf switches 1 to 8
2. OCS 1A to 8B
3. Spine switches
4. OCS 1B to 8B
5. Leaf switches 1 to 8.

The layout of the optoelectronic switch as shown in FIG. 1 will now be described in more detail, in order to demonstrate exactly the meaning of some of the terms used in the "Summary of the invention" section above, with particular attention drawn to the make-up of the "clusters". In FIG. 1, the eight leaf switches 1 to 8 are arranged into four clusters, each containing two leaf switches, i.e., {1, 2}, {3, 4}, {5, 6}, {7, 8}. Each of these clusters of leaf switches is associated with a cluster of fabric entry OCS 1A to 8A, as shown below in Table 1.

TABLE 1

| Cluster of leaf switches | Cluster of fabric entry OCS |
| --- | --- |
| 1, 2 | 1A, 2A |
| 3, 4 | 3A, 4A |
| 5, 6 | 5A, 6A |
| 7, 8 | 7A, 8A |

Each leaf switch in the cluster is connected to each of the fabric-entry OCS in the associated cluster, e.g., leaf switch 1 is connected to fabric-entry OCS 1A and 2A, and leaf switch 2 is connected to fabric entry OCS 1A and 2A. The same applies for the constituent leaf switches in each of the clusters. Still concentrating on a single cluster, it can be seen in FIG. 1 that fabric-entry OCS 1A is connected to spine switches 1 and 2, and fabric-entry OCS 2A is connected to spine switches 3 and 4. Thus, no two fabric-entry OCS in a given cluster of fabric-entry OCS are connected to the same spine switch. In other words, in a given cluster of fabric-entry OCS, each of the fabric-entry OCS are connected to a different, disjoint set of spine switches. In FIG. 1, the same is true of all of the clusters of fabric-entry OCS.

There is a corresponding cluster arrangement for the fabric-exit OCS 1B to 8B. The associations between the leaf switches 1 to 8 and fabric-exit OCS 1B to 8B is shown in Table 2 below.

TABLE 2

| Cluster of leaf switches | Cluster of fabric exit OCS |
|---|---|
| 1, 2 | 1B, 2B |
| 3, 4 | 3B, 4B |
| 5, 6 | 5B, 6B |
| 7, 8 | 7B, 8B |

As will be appreciated from the symmetrical arrangement shown in FIG. 1, the connections between the fabric-exit OCS 1B to 8B and the spine switches 1 to 4 are the same as that for the fabric-entry OCS 1A to 8A. Fabric-exit OCS 1B is connected to spine switches 1 and 2, and fabric-exit OCS 2B is connected to spine switches 3 and 4. Thus, no two fabric-exit OCS in a given cluster are connected to the same spine switch. In other words, in a given cluster of fabric-exit OCS, each of the fabric-exit OCS are connected to a different, disjoint subset of spine switches. In FIG. 1, the same is true of all of the clusters of fabric-exit OCS.

Figure 2:
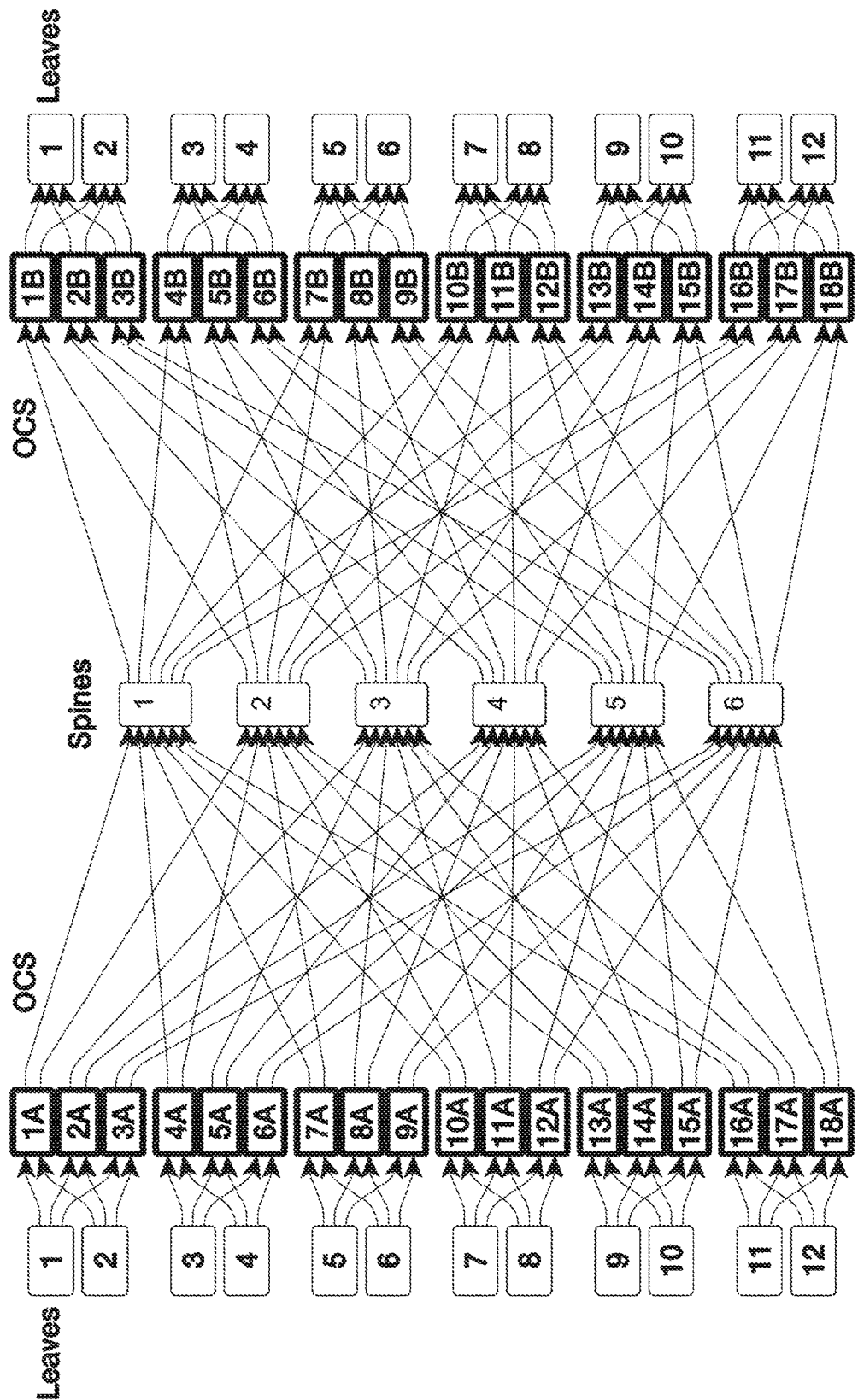
Figure 3:
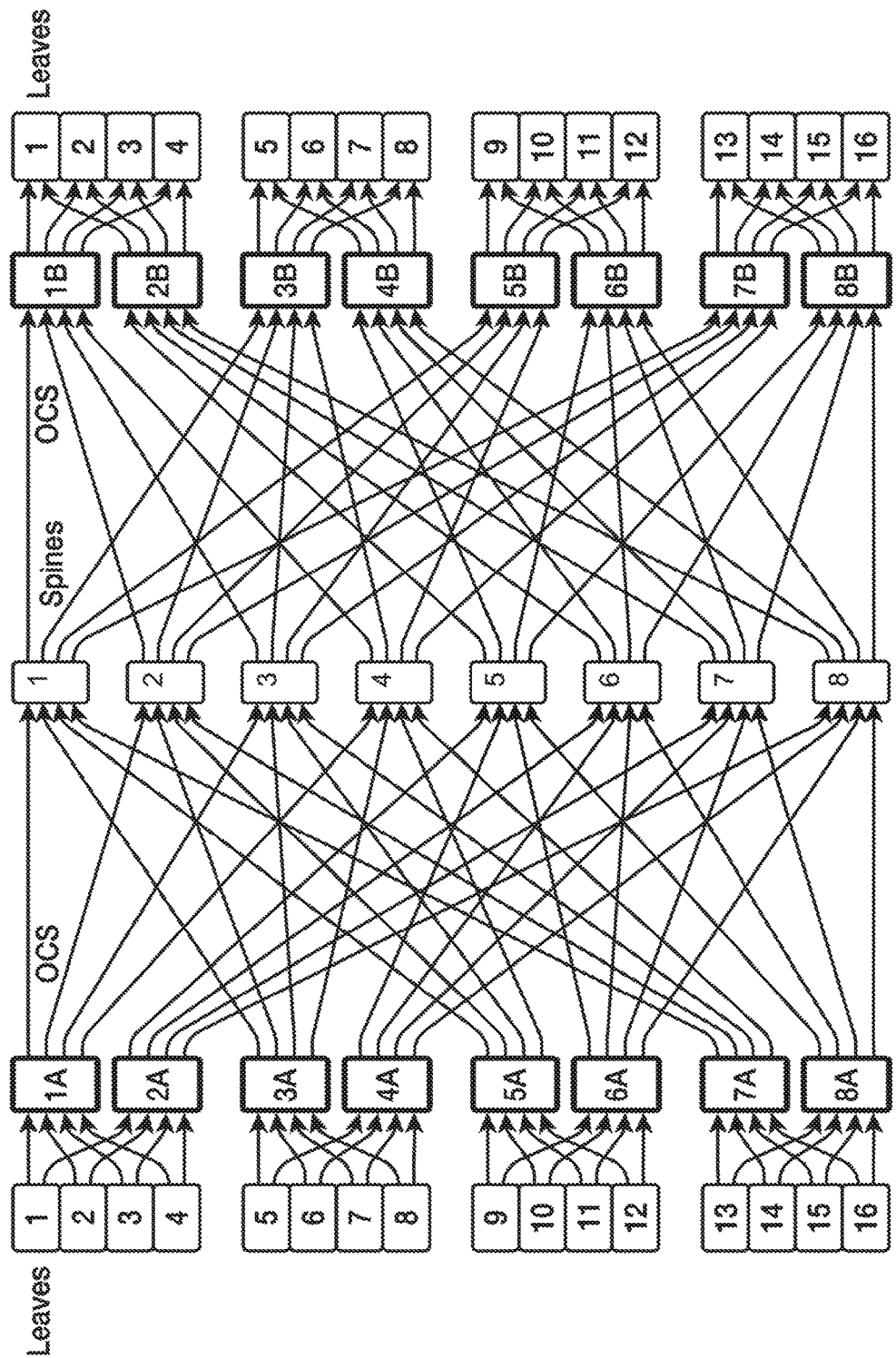
Figure 4:
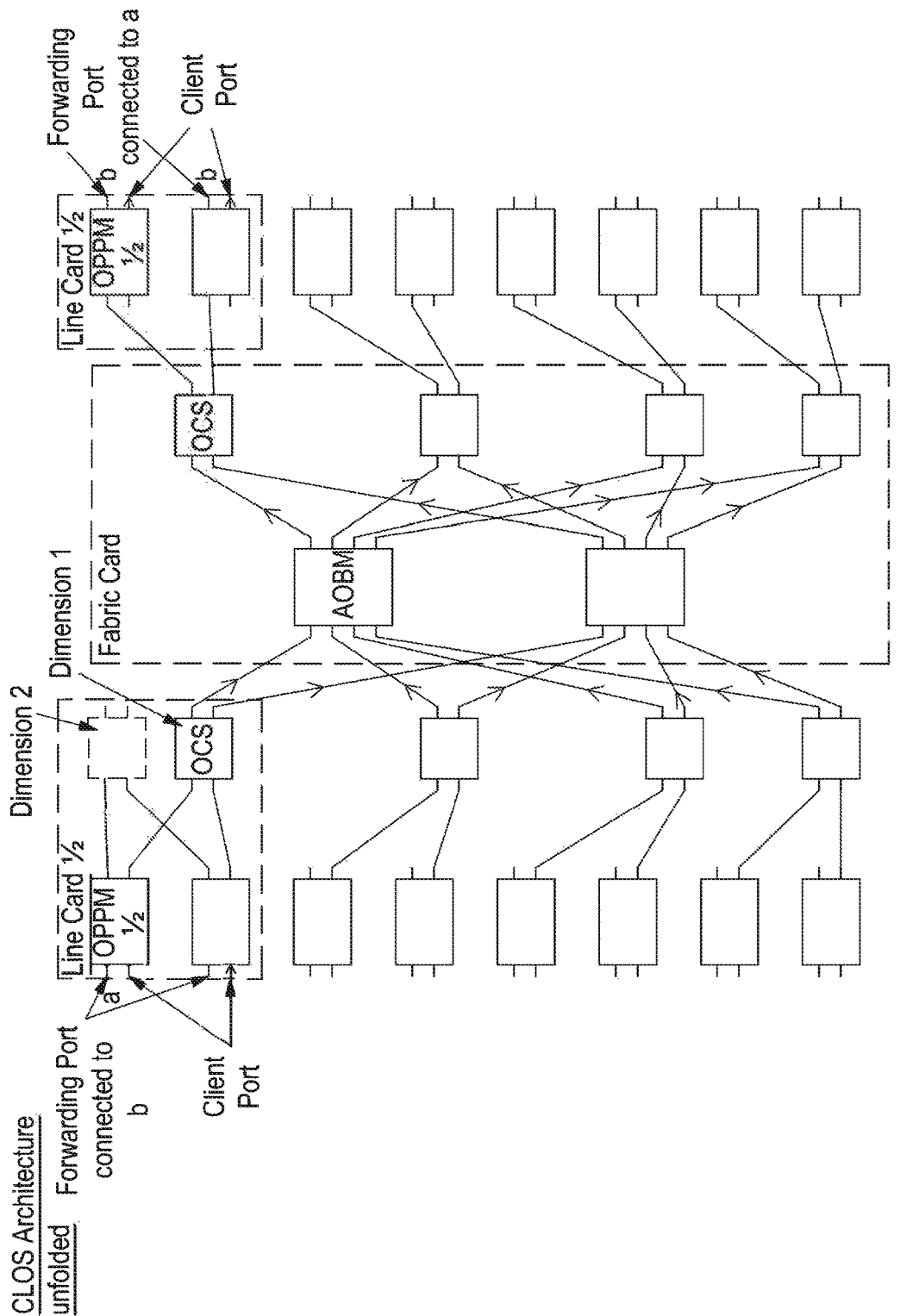

FIGS. 2, 3, and 4 show similar, Clos network arrangements of switching elements within a sub-array, again including clusters of leaf switches which have associated clusters of fabric-entry OCS and fabric-exit OCS. The description of FIG. 1 still applies to these drawings, so they will not be described again in full, only the differences being highlighted.

In FIG. 2, the radix of the leaf switches and spine switches is six, and the radix of the fabric-entry and fabric-exit OCS is two. Table 3 below sets out the association between clusters of leaf switches, clusters of fabric-entry OCS and clusters of fabric-exit OCS.

TABLE 3

| Cluster of leaf switches | Cluster of fabric-entry OCS | Cluster of fabric-exit OCS |
|---|---|---|
| 1, 2 | 1A, 2A, 3A | 1B, 2B, 3B |
| 3, 4 | 4A, 5A, 6A | 4B, 5B, 6B |
| 5, 6 | 7A, 8A, 9A | 7B, 8B, 9B |
| 7, 8 | 10A, 11A, 12A | 10B, 11B, 12B |
| 9, 10 | 13A, 14A, 15A | 13B, 14B, 15B |
| 11, 12 | 16A, 17A, 18A | 16B, 17B, 18B |

Each of leaf switches 1 and 2 is connected to each of fabric-exit OCS 1A to 3A. Then, fabric-entry OCS 1A is connected to spine switches 1 and 2, fabric-entry OCS 2A is connected to spine switches 3 and 4 and fabric-entry OCS 3A is connected to spine switches 5 and 6. The same pattern applies for each of the clusters of leaf switches/fabric-entry OCS. The same also applies for the clusters of fabric-exit OCS.

In FIG. 3, the radix of the leaf switches and spine switches is four, as is the radix of the fabric-entry and fabric-exit OCS. Table 3 below sets out the association between clusters of leaf switches, clusters of fabric-entry OCS and clusters of fabric-exit OCS.

TABLE 4

| Cluster of leaf switches | Cluster of fabric-entry OCS | Cluster of fabric-exit OCS |
|---|---|---|
| 1, 2, 3, 4 | 1A, 2A | 1B, 2B |
| 5, 6, 7, 8 | 3A, 4A | 3B, 4B |
| 9, 10, 11, 12 | 5A, 6A | 5B, 6B |
| 13, 14, 15, 16 | 7A, 8A | 7B, 8B |

Each of leaf switches 1 to 4 is connected to each of fabric-exit OCS 1A and 2A. Then, fabric-entry OCS 1A is connected to spine switches 1 to 4, fabric-entry OCS 2A is connected to spine switches 5 to 8. The same pattern applies for each of the clusters of leaf switches/fabric-entry OCS. The same also applies for the clusters of fabric-exit OCS.

A yet further example is shown in FIG. 4, in which the radix of the leaf switches and spine switches is four, the radix of the OCS is two and the sub-array contains eight leaf switches. This drawing also highlights how the various components may be located on line cards and a fabric card.

In FIGS. 1 to 4, a one-dimensional arrangement is shown. However, this invention is by no means restricted to one-dimensional arrangements such as this. For example, the arrangement of the connections between the various switching elements which is shown in FIGS. 1 to 4 may be used to interconnect the switching elements of a single sub-array of which a given leaf switch is part, in a higher-dimensional array. For example, consider a two-dimensional arrangement of leaf switches, in rows and columns (each row and each column represent sub-arrays in this case). Then, the leaf switches in a sub-array corresponding, e.g., to a given row, may be connected as shown in FIGS. 1 to 4. In preferred embodiments, for topological regularity, each of the sub-arrays associated with a given dimension in the array may be connected in the same manner, or all of the sub-arrays in the whole array.

Figure 5A:
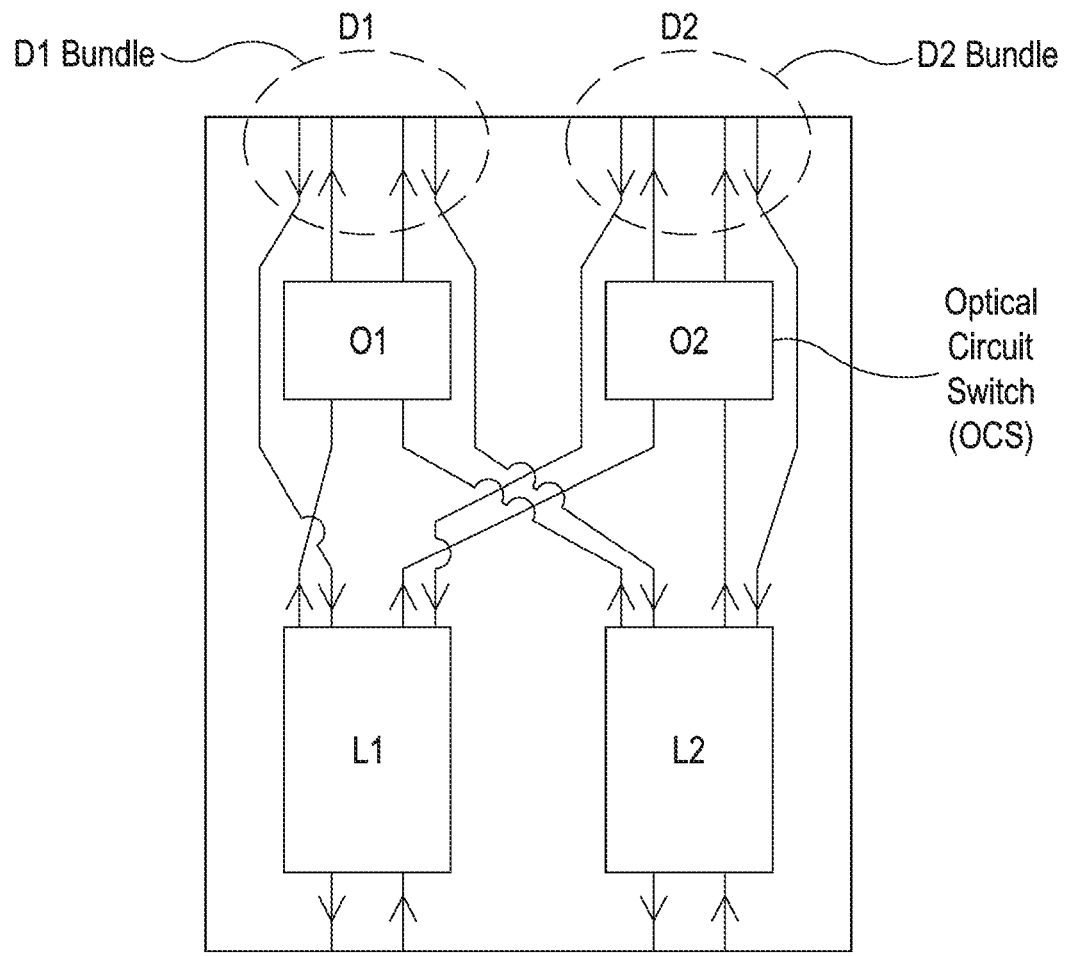
FIGS. 5A/B are schematic diagrams showing a line card and fabric card respectively.
Figure 5B:
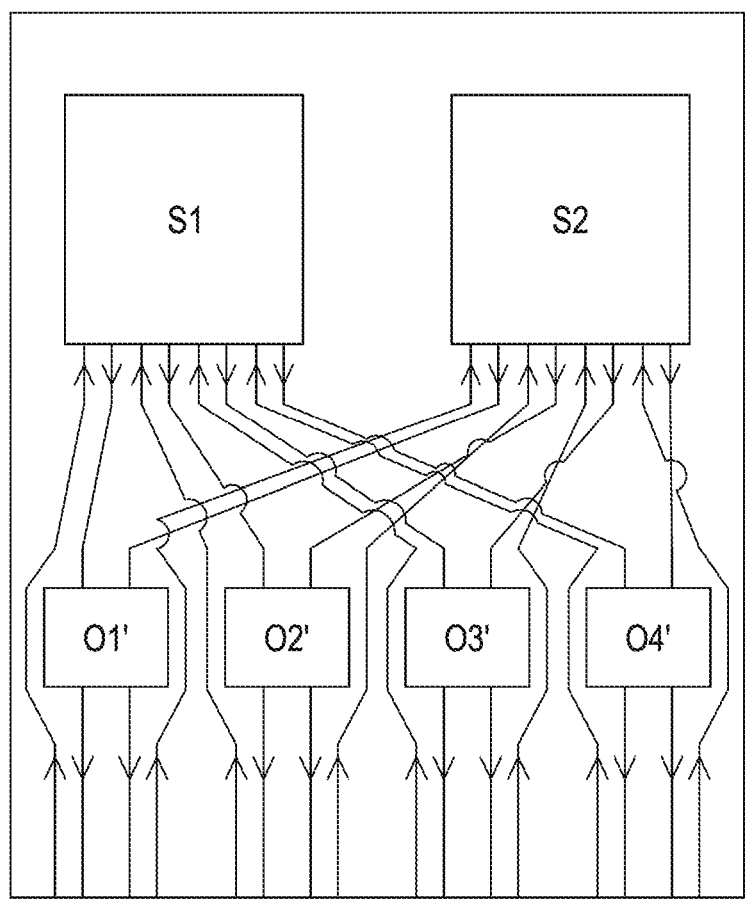
Figure 6:
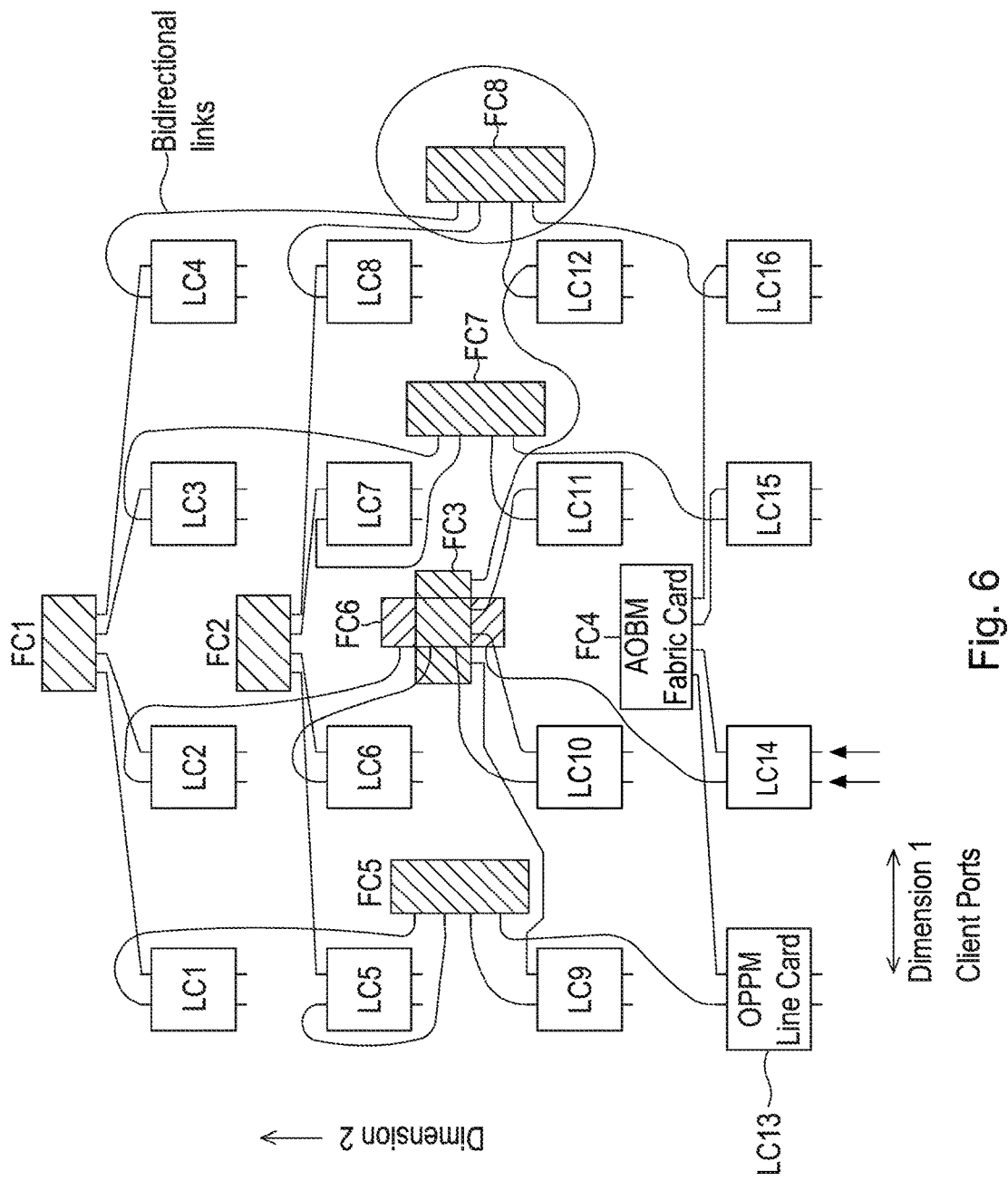
FIG. 6 is a schematic diagram showing the connections between the leaf switches, spine switches and optical active switches in a two-dimensional array of switching elements, the connections in both dimensions being depicted.

In FIG. 6, a two-dimensional array of leaf switches is shown, in which the leaf switches and spine switches are organized with the optical active switches on line cards and fabric cards respectively. FIGS. 5A and 5B respectively show the arrangement of components on the line card and fabric cards in more detail. Before discussing the higher-level of the whole array, these will be described.

FIG. 5A shows a line card. The line card includes two leaf switches L1 and L2, and two (fabric-entry) optical active switches, which in this case are optical circuit switches O1 and O2. Each of the OCS O1 and O2 are associated with a different dimension (denoted D1 and D2 here, where D1 is the horizontal and D2 is the vertical dimension). Each of the leaf switches L1 and L2 have a connection to each of the OCS O1 and O2, in order to facilitate switching in both dimensions. The switching in D1 is the same as the switching in D2, and so only switching in D1, i.e., only the right hand bundle, or "D1 bundle" of connections circled will be considered in this description. Specifically, the D1 bundle contains two outputs from OCS O1, and two inputs from the fabric, which pass (one each) to L1 and L2 without going via OCS O1 and O2.

FIG. 5B shows a fabric card. The fabric card includes two spine switches (or AOBMs) S1 and S2, and four (fabric-exit) optical active switches. It should be noted that in the arrangement shown in FIG. 6, and indeed, all arrays having more than one dimension, the components which are located on a given fabric card are associated with switching only in one dimension. This is explained in more detail with reference to the high-level structure of FIG. 6. Each spine switch has a radix of four, i.e., it has four inputs and four outputs. Consider first the inputs. The inputs do not come from the OCS O1' to O4' on the fabric card, since these are the fabric-exit OCS, via which signals exit the fabric, and not from which they enter the fabric. Consider first S1. Rather, the inputs to the spine switches S1 and S2 correspond (i.e., are connected) to the outputs of in the D1 bundle of each of the line cards contained in the sub-array for which the fabric card in question is responsible for switching.

The four outputs on each of the spine switches S1 and S2 are connected to OCS O1' to O4'. More specifically, each of the spine switches S1 and S2 has one output to each of OCS O1' to O4'. Each of the fabric-exit OCS O1' to O4' (each of which has two inputs, one from each spine switch S1 and S2) has two outputs. These two outputs correspond (i.e., are connected) to the two inputs in the D1 bundle discussed above with reference to FIG. 5A.

An identical arrangement of connections is in place for switching in D2, though these are not shown in the drawings. By arranging the switching elements in this fashion, a five-tier Clos network as described above is formed, which is able to switch signals from one leaf switch in a given sub-array to another leaf switch in the same sub-array, in a non-blocking fashion.

FIG. 6 shows a diagram of the whole array, unlike FIGS. 5A and 5B which show only a single line card and fabric card respectively. From FIG. 6, the "star-like" nature of the topology can be appreciated. Consider one of the sub-arrays in the array, e.g., the top row of line cards in the D1 direction shown. Each of the line cards LC1 to LC4 in the sub-array is connected to a central fabric card FC1, through which signals are switched. The same applies for the sub-arrays in the D2 direction. In order to appreciate the switching process in detail, it is useful to outline the path of an exemplary signal from, e.g., LC2 to LC12 which are not located in the same sub-array, in either the D1 or D2 direction. Firstly, assuming dimension-ordered routing as described above, the signal will be switched in the D1 direction first. Accordingly, the signal passes from LC2 to LC4, in the process going via FC1. More specifically, the signal may originate from L1 in LC2, from there, since it is switching first in the D1 direction, it travels to O1, and then takes one of the connections in the D1 bundle to an input of, e.g., S2 of FC1, and subsequently switching takes place within the spine switch S2 and the signal is output to O4' via one of the outputs of S2. From O4', the signal then travels to an input of, e.g., L1 of LC4 (via the D1 bundle of LC4). Here, it is switched internally to an output of L1 which is connected to an input of O2 of LC4, i.e., to the fabric-entry OCS which is associated with switching in dimension D2. Then, the signal is sent from the D2 bundle to an input of, e.g., S1 of FC8, which is the fabric card containing the spine switches responsible for switching in the sub-array containing both LC4 and LC12. Then, the signal is switched within S1 of FC8 to the output which is connected to, e.g., L2 of FC12, and then the signal travels from that output to L2 of FC12. By this point the signal has arrived at the leaf switch required, and subsequently, the signal is transferred to a client output of L2 and from there to an external device. This process extends simply into three or more dimensions, whereby each line card has one or more OCS and a further bundle of connections associated with switching in the third dimension.

Figure 7:
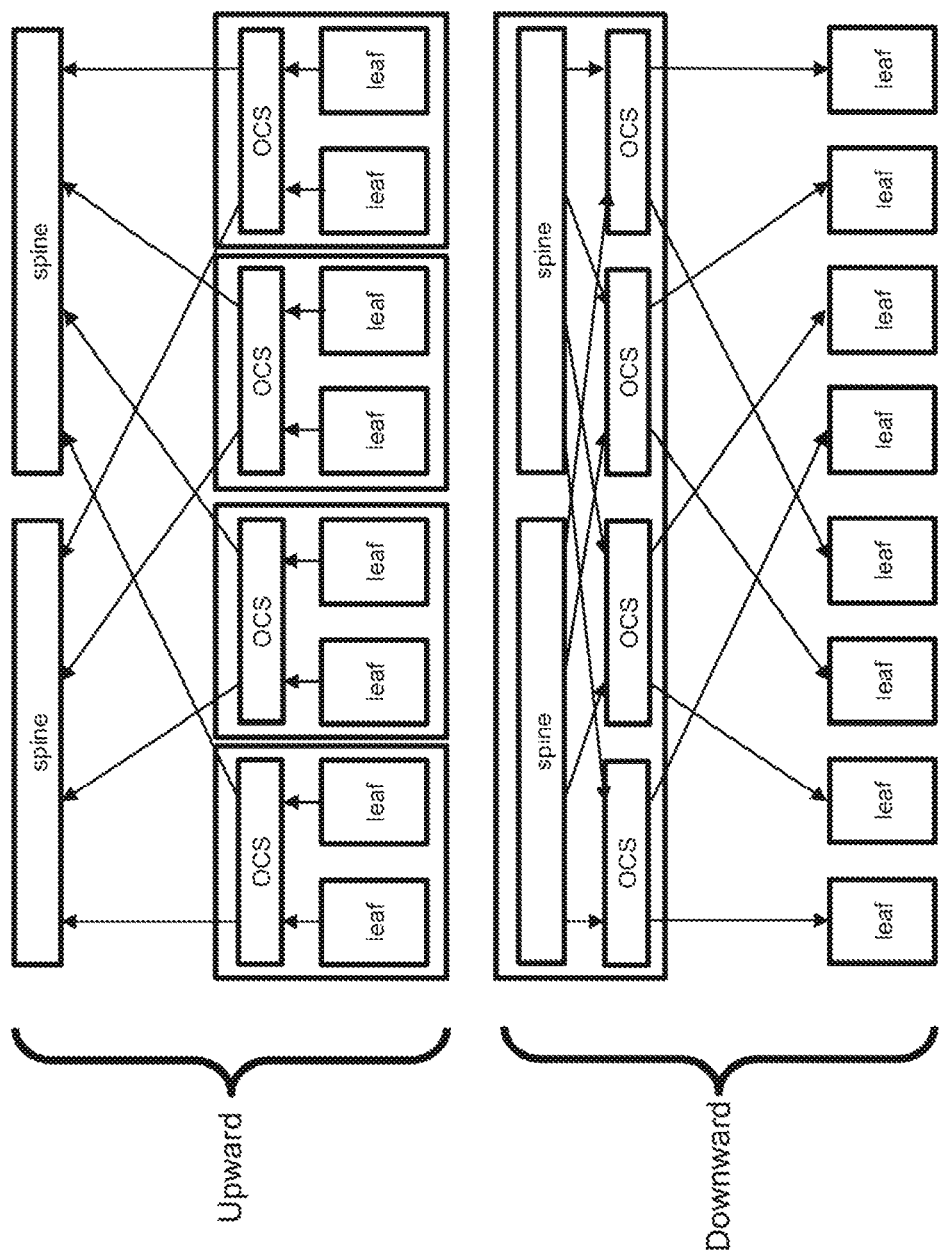
FIG. 7 is a schematic diagram showing an alternative representation of the connections between leaf switches, spine switches and optical active switches in one dimension in a given sub-array. The drawing highlights the difference in the "upward" and "downward" direction, and shows the arrangements of the leaves and spines on fabric and line cards.

FIG. 7 shows an alternative representation of a one-dimensional case, which highlights the difference between the "upward" and "downward" journeys of a signal as it traverses a given sub-array. The "upward" journey, as is shown in the drawing, refers to the signal travelling from the leaf switch, through a fabric-entry OCS, and into a spine switch. In contrast, the "downward" journey is from the spine switch, through a fabric-exit OCS, and into a destination leaf switch. The OCS shown in the "upward" section are the fabric-entry OCS which are located on the line cards with the leaf switches. In this example, the clusters of leaf switches contain two leaf switches, and the associated clusters of fabric-entry OCS each contain only one fabric-entry OCS. In the "downward" section, the OCS are the fabric-exit OCS, and are arranged on the fabric card with the two spine switches (which are the same spine switches shown in the "upward" section).

Figure 8:
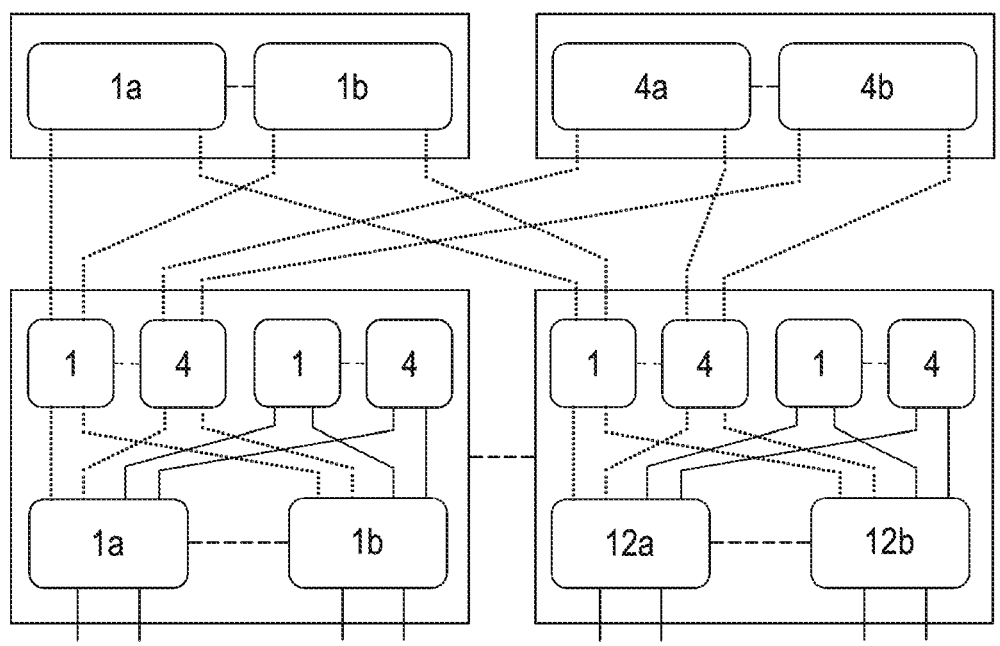
FIGS. 8, 9, and 10 show partially folded representations of 2D optoelectronic switches.
Figure 9:
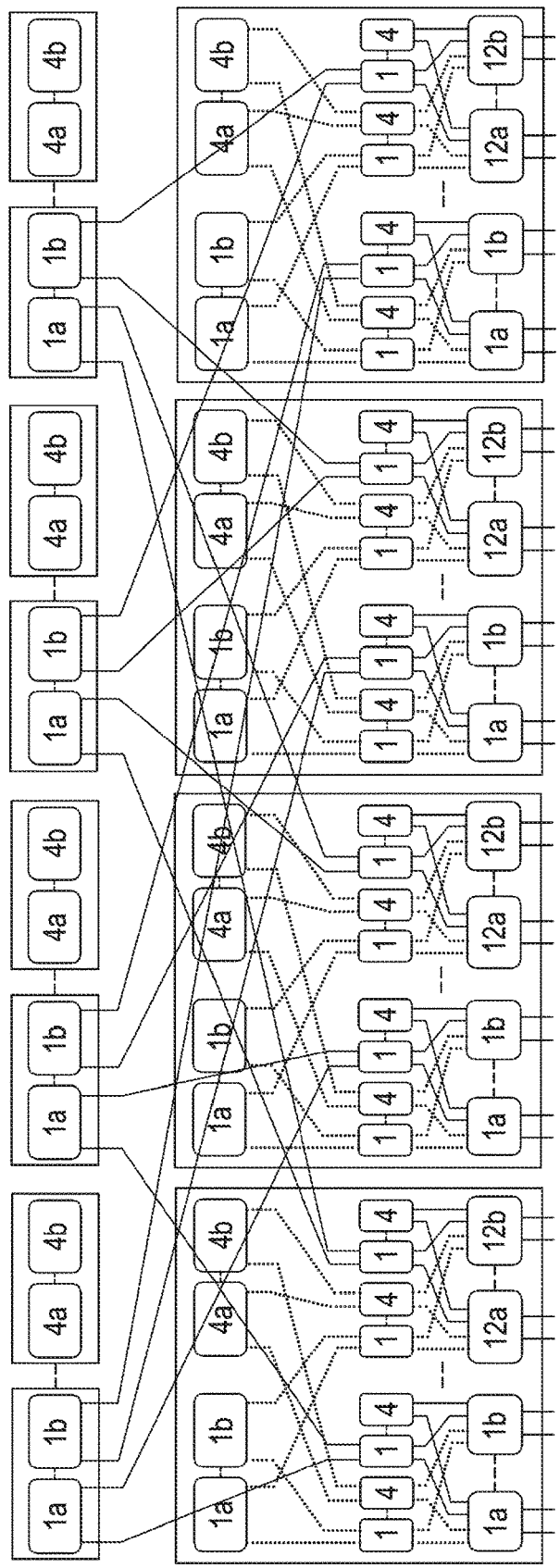
Figure 10:
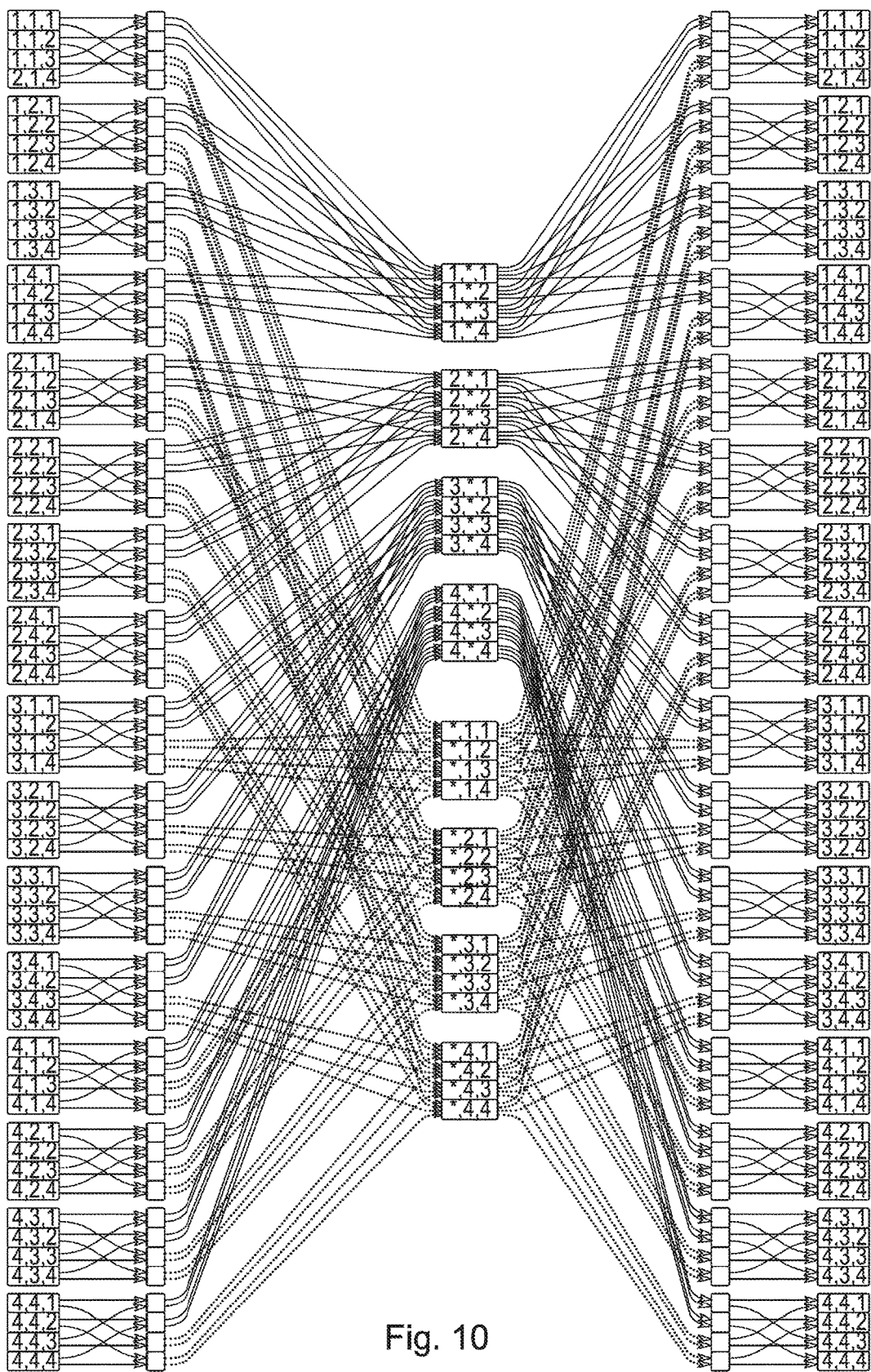

FIG. 8 shows a one-dimensional example of the connections in an optoelectronic switch according to embodiments of the invention as described in greater detail above. In FIG. 8, the leaf switches are only depicted once, in a partially folded configuration. Please note that this is not a true folded-Clos network, because the fabric-entry and fabric-exit OCS are different, so the signal cannot travel "up" and "down" (see FIG. 7) by exactly the same route. Similarly, FIG. 9 shows a partially folded representation of a 2-dimensional optoelectronic switch according to the present invention. FIG. 10 shows an alternative, unfolded representation of a 2-dimensional optoelectronic switch including an array of sixty-four leaf switches at the edges of the drawings, and two sets of sixteen spine switches in the center (one associated with switching in each of the dimensions). The dotted lines represent connections in one dimension, and the sold lines represent connections in the other dimension.

It should be noted that embodiments of the invention are not restricted to arrangements wherein the leaf and spine switches have a radix of four, and the OCS have a radix of two.

Figure 11:
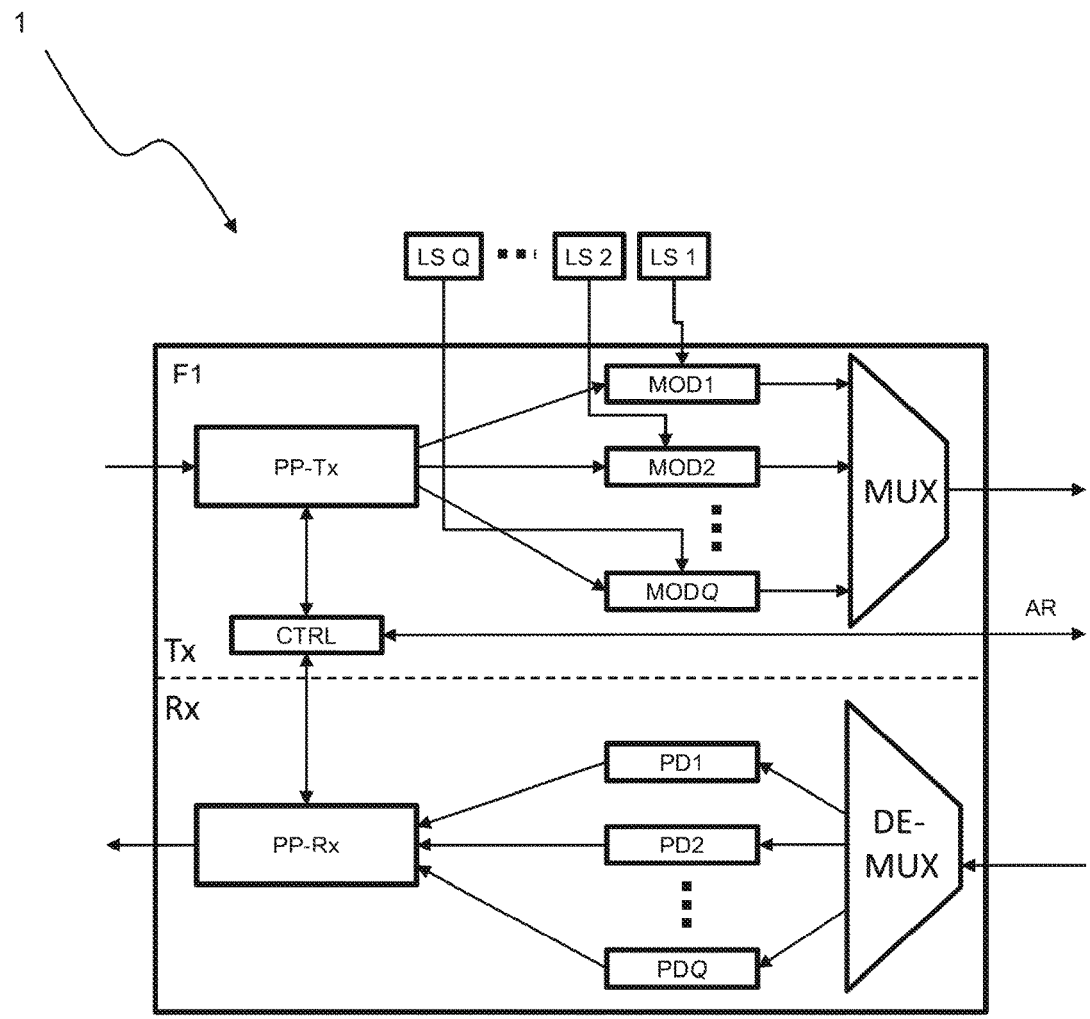
FIG. 11 shows an example of a leaf switch which may be used in embodiments of the present invention.

FIG. 11 shows a more detailed view of the fabric side F1 of a typical leaf switch 1 which is used in embodiments of the present invention. First, the structure of the leaf switch 1 will be described, followed by a description of the path of a signal through the leaf switch 1. Fabric side F1 is divided into two parts, a transmission side Tx and a receiving side Rx. Transmission side Tx includes a packet processor PP-Tx, an array of EAMs MOD1, MOD2 . . . MODQ, each of which receives an input from one of an array of light sources LS1, LS2 . . . LSQ. Each of the array of EAMs is connected to a single multiplexer MUX, which then outputs its WDM signal to an optical active switch, which can be thought of as "the fabric" which effects interconnection between all of the leaf switches 1 of the optoelectronic switch of embodiments of the present invention. Receiving side Rx has a similar structure. More specifically, the receiving side Rx includes a packet processor PP-Rx, which receives inputs from an array of photodetectors PD1, PD2 . . . PDQ, which each receive input from a single demultiplexer DEMUX. The demultiplexer receives an input from an optical active switch (not shown in FIG. 11). A controller CTRL is also included in the leaf switch 1, and is not constrained to either the transmission side Tx or the receiving side Rx. The controller CTRL is connected bidirectionally to the two packet processors PP-Tx, PP-Rx and an arbiter, shown by the arrow labelled AR.

At a higher level, it is noted that all transfer of data occurring on the left-hand side of the drawing occurs in the electrical domain, and all data transfer occurring on the right-hand side of the drawing occurs in the optical domain, i.e., all data transfers taking place between the multiplexer MUX and the demultiplexer DEMUX.

Now, the journey of a packet through the various components of leaf switch 1 will be described. A packet contains information which is to be transmitted from a source leaf switch to a destination leaf switch. Specifically, the packet contains information relating to the intended destination leaf switch. In the following description of the journey taken by the packet, it is assumed that all data which is associated with that packet has the same intended destination leaf switch.

The following processes take place in the electrical domain. A packet may be incident on the transmission side Tx of the leaf switch 1 for example from a client portion which is connected to the client side of the leaf switch 1. Alternatively, the packet may be received from the receiving side Rx of leaf switch 1, (i.e., the same leaf switch) via an integrated switch, so that said packet can be forwarded to another leaf switch (not shown), for transfer to a different dimension. The packet incident on transmission side Tx enters the packet processor PP-Tx, where it is sliced into a first plurality of Q electronic signals in the form of packet slices, each with the same destination leaf switch. Each of the electrical signals is then transmitted to one of the Q EAMs MOD1, MOD2 . . . MODQ. At this point, each of the electrical signals contains information corresponding to the data in the packet slice and information relating to the destination leaf switch of the packet.

Consider now the packet slice which is incident on MOD1. MOD1 has two inputs: (a) the electrical packet slice, and (b) light of a given wavelength from a light source LS1. The optical channel is chosen to minimize cross-talk and to be relatively easy to manufacture the waveguides in good yield. Optical channel spacing of between 0.4 nm and 2 nm is preferable. The laser light would be of as narrow line width as practical for the application and is preferably no less than 1 KHz. In other configurations, the frequency resolution and spacing will depend on the finesse of the device, and hence the passive components. If there are, e.g., 8 wavelengths, then the device may be quite "crude", but if more wavelengths are to be used, a higher specification will be required.

MOD1 then modulates the light from the light source LS1 to carry the information contained in the packet slice, to produce an optical signal with a given wavelength. From this point, data transfer is in the optical domain. Each modulator operates similarly to produce a first plurality of Q optical signals. The Q optical packet slices from each of the EAMs MOD1, MOD2 . . . MODQ are incident on the multiplexer MUX where wavelength-division multiplexing takes place to combine the Q optical signals (one from each EAM) into a single output optical fiber. Each of the Q optical signals has a different wavelength, and so crosstalk between signals is minimized. The multiplexed signal forming the multiplexed fabric output signal is then transmitted to an optical active switch. The optical signals generated in leaf switch 1 are then transmitted via the fabric to their destination leaf switch or an intermediate leaf switch en route to the destination leaf switch.

For the purposes of this description, we will continue referring to FIG. 11, but in normal use, the source and destination leaf switches would not be the same leaf switch. The source and destination leaf switches may be the same leaf switch, however, e.g., for testing purposes. However, the source and destination leaf switches are to be substantially identical to each other, so the description based on FIG. 11 still applies equally well. The optical multiplexed fabric input signal from an optical active switch is incident on demultiplexer DEMUX which is located on the receiving side Rx of the leaf switch 1. The multiplexed fabric input signal is demultiplexed by the demultiplexer DEMUX into a second plurality of Q optical signals which are equivalent to those combined at the multiplexer MUX on the source leaf switch 1. The Q demultiplexed signals are then incident on each of an array of photodetectors PD1, PD2 . . . PDQ. Therein, they are converted back into a second plurality of Q electrical signals, again containing the information which was contained in the original packet slices. The electrical signals are then transmitted to the packet processor PP-Rx, where, using information contained in the headers of the packet slices, they are recombined into the original packet which was incident on the packet processor PP-Tx of the source leaf switch 1.

FIG. 12 shows the mathematical relationship between various quantities involved in optoelectronic switches according to embodiments of the present invention, in which:

L=number of dimensions
$R_1$=radix of leaves and spines
$R_2$=radix of number of leaves per cluster, number of spines per cluster
C=client ports per leaf, parallel spines
F=fabric ports per leaf
U=unused ports per leaf
N=total number of client ports
$P_1$=total number of leaves
$P_2$=total number of spines
$P_3$=total number of OCS
D=diameter
B=bisection bandwidth.

Although exemplary embodiments of an optoelectronic switch have been specifically described and illustrated herein, many modifications and variations will be apparent to those skilled in the art. Accordingly, it is to be understood that an optoelectronic switch constructed according to principles of this invention may be embodied other than as specifically described herein. The invention is also defined in the following claims, and equivalents thereof.

The invention claimed is:

1. An L-dimensional optoelectronic switch for transferring an optical signal from an input device to an output device, the optoelectronic switch including:
  a plurality of leaf switches, each having a radix R, and arranged in an L-dimensional array, in which each dimension i has a respective size $R_i$ (i=1, 2, . . . , L), each leaf switch having an associated L-tuple of co-ordinates $(x_1, \ldots, x_L)$ giving its location with respect to each of the L dimensions;
  wherein each leaf switch is a member of L sub-arrays, each of the L sub-arrays associated with a different one of the L dimensions, and including:
    a plurality of $R_i$ leaf switches, whose co-ordinates differ only in respect of the $i^{th}$ dimension, each leaf switch having C client ports for connecting to an input device or an output device, and F fabric ports for connecting to spine switches; and a plurality of $S_i$ spine switches, each having R fabric ports for connecting to the fabric ports of the leaf switches, and wherein, in a given sub-array each leaf switch in the sub-array is connected to each spine switch via an optical active switch, wherein L is an integer greater than 1, wherein each of the spine switches is configured to perform switching in only one dimension, and wherein a first spine switch of the spine switches is configured to perform switching in a first dimension of the L dimensions, and a second spine switch of the spine switches is configured to perform switching in a second dimension of the L dimensions.

2. An optoelectronic switch according to claim 1, wherein in a given sub-array, the number of leaf switches is greater than the number of spine switches.

3. An optoelectronic switch according to claim 1, wherein the leaf switches are divided into a plurality of clusters, each cluster containing a plurality of leaf switches.

4. An optoelectronic switch according to claim 3, wherein:

each cluster of leaf switches is associated with a cluster of one or more fabric-entry optical active switches of the optical active switches to form a line card assembly, each leaf switch in the cluster is connected to each fabric-entry optical active switch in the line card assembly, and the fabric-entry optical switches are arranged so that optical signals pass through said fabric-entry optical active switches during transfer from a leaf switch to a spine switch.

5. An optoelectronic switch according to claim 4, wherein, in a given sub-array:

each spine switch is connected to a fabric-entry optical active switch in a line card assembly located in that sub-array, and no more than one fabric-entry optical active switch in that line card assembly is connected to a given spine switch.

6. An optoelectronic switch according to claim 5, wherein within a line card assembly, there are L distinct sets of fabric-entry optical active switches, each set configured to transfer optical signals within a respective sub-array containing that line card assembly, each of those sub-arrays associated with a respective one of the L dimensions.

7. An optoelectronic switch according to claim 4, wherein each line card assembly is located on a respective line card.

8. An optoelectronic switch according to claim 7, wherein the line card includes an arbiter for controlling the path of a signal through a fabric-entry optical active switch included in the line card assembly located on that line card.

9. An optoelectronic switch according to claim 8, wherein the line card includes a plurality of arbiters, each arbiter configured to control the path of a signal through a respective fabric-entry optical active switch.

10. An optoelectronic switch according to claim 4, wherein:

each cluster of leaf switches is further associated with a cluster of one or more fabric-exit optical active switches to form a fabric-exit arrangement, each leaf switch in a given cluster is connected to each fabric-exit optical active switch in the fabric-exit arrangement, and the fabric-exit optical active switches are arranged so that optical signals pass through said fabric-exit optical active switches during transfer from a spine switch to a leaf switch.

11. An optoelectronic switch according to claim 10 wherein, in a given sub-array:

each spine switch is connected to a fabric-exit optical active switch in a fabric-exit arrangement located in that sub-array, and no more than one fabric-exit optical active switch in that fabric-exit arrangement is connected to a given spine switch.

12. An optoelectronic switch according to claim 10, wherein in a given sub-array, the spine switches and the fabric-exit optical active switches are located on a fabric card.

13. An optoelectronic switch according to claim 12, wherein the fabric card includes an arbiter for controlling the path of a signal through a fabric-exit optical active switch located on that fabric card.

14. An optoelectronic switch according to claim 13, wherein the fabric card includes a plurality of arbiters, each arbiter configured to control the path of a signal through a respective fabric-exit optical active switch on the fabric card.

15. An optoelectronic switch according to claim 10, wherein in a given sub-array, the number of fabric-exit optical active switches is the same as the number of fabric-entry optical active switches.

16. An optoelectronic switch according to claim 15, wherein in a given sub-array, the leaf switches, spine switches, fabric-entry optical active switches and the fabric-exit optical active switches are arranged in a five-stage Clos network in which:

the first stage is made up of the leaf switches;

the second stage is made up of the fabric-entry optical active switches;

the third stage is made up of the spine switches;

the fourth stage is made up of the fabric-exit optical active switches; and the fifth stage is made up of the leaf switches.

17. An optoelectronic switch according to claim 1, wherein number of inputs on each optical active switch is the same as the number of outputs.

18. An optoelectronic switch according to claim 1, wherein the optical active switches are optical circuit switches.

19. An optoelectronic switch according to claim 18, wherein the optical circuit switch is a Mach-Zehnder interferometer (MZI) cascade switch, comprising a plurality of MZIs, each MZI having two arms which split at an input coupler, with two arms feeding the split paths into an output coupler, where they are recombined, and two output portions, the plurality of MZIs arranged to provide a pathway from each input to each output of the MZI cascade switch.

20. An optoelectronic switch according to claim 1, wherein the spine switches are electronic active switches.

21. An optoelectronic switch according to claim 20, wherein the electronic active switches are electronic crossbar switches or electronic shared-memory switches.

22. An optoelectronic switch according to claim 1, wherein each leaf switch includes:

a client port for connecting to an input device or an output device and a client portion connected to the client port;

a first fabric portion and a second fabric portion, connected respectively to a first fabric port and a second fabric port for processing signals and communicating with spine switches or optical active switches, the first fabric portion having a transmission side and a receiving side, wherein the transmission side includes:
a transmission side input for receiving a first electronic signal carrying information including information about a destination leaf switch of the first electronic signal, the first electronic signal being received from either:
an output of the second fabric portion, or
an input device, via the client portion and the client port;
a modulator for converting said first electronic signal into a first plurality of optical signals containing the same information;
a transmission side multiplexer for converting the first plurality of optical signals into a multiplexed fabric output signal for transmission to an input of an optical active switch;
wherein the receiving side includes:
a receiving side demultiplexer for receiving a multiplexed fabric input signal from an output of an optical active switch, and converting said multiplexed fabric input signal into a second plurality of optical signals;
a photodetector for converting said second plurality of optical signals into a second electronic signal; and
a receiving side output for sending the second electronic signal to either:
a transmission side input of the second fabric portion, or
an output device, via the client portion and the client port.

23. An optoelectronic switch according to claim 22, wherein the transmission side of the first fabric portion includes a transmission side packet processor, configured to receive the first electronic signal in the form of a packet, the packet having a packet header containing the destination information.

24. An optoelectronic switch according to claim 23, wherein the transmission side packet processor is configured to perform packet fragmentation wherein:
packets of data having the same destination leaf switch are arranged into frames having a predetermined size;
packets of data may be split over one or more frames into packet fragments; and
a frame may contain data from one or more packets.

25. An optoelectronic switch according to claim 24, wherein the receiving side of the first fabric portion includes a receiving side packet processor, configured to recreate the original packet of data from the packet fragments, when said packet is spread over more than one frame.

26. An optoelectronic switch according to claim 23, wherein:
the transmission side of the first fabric portion includes a plurality of modulators;
the transmission side packet processor is configured to perform packet slicing, wherein a frame or packet is sliced into a first plurality of electronic signals; and
after slicing, the transmission side packet processor is configured to send each of the first plurality of electronic signals to a different modulator in the plurality of modulators, whereby they are converted into the first plurality of optical signals.

27. An optoelectronic switch according to claim 26, wherein the receiving side of the first fabric portion includes a plurality of photodetectors, configured to convert the second plurality of optical signals into a second plurality of electronic signals, and further includes a receiving side packet processor configured to recombine the second plurality of electronic signals into the second electronic signal.

28. An optoelectronic switch according to claim 23, wherein
the transmission side packet processor sends frames and/or packet fragments in a series of successive bursts, each burst containing only packets and/or packet fragments having the same destination leaf switch, and wherein pairs of sequential bursts are separate by a time interval.

29. An optoelectronic switch according to claim 1, wherein each of the spine switches contains the same components as each of the leaf switches.

30. An optoelectronic switch according to claim 29, wherein each spine switch includes:
a first fabric portion and a second fabric portion, connected respectively to a first fabric port and a second fabric port for processing signals and communicating with leaf switches or optical active switches, the first fabric portion having a transmission side and a receiving side,
wherein the transmission side includes:
a transmission side input for receiving a first electronic signal carrying information including information about a destination leaf switch of the first electronic signal, the first electronic signal being received from an output of the second fabric portion;
a modulator for converting said first electronic signal into a first plurality of optical signals containing the same information;
a transmission side multiplexer for converting the first plurality of optical signals into a multiplexed fabric output signal for transmission to an input of an optical active switch;
wherein the receiving side includes:
a receiving side demultiplexer for receiving a multiplexed fabric input signal from an output of an optical active switch, and converting said multiplexed fabric input signal into a second plurality of optical signals;
a photodetector for converting said second plurality of optical signals into a second electronic signal; and
a receiving side output for sending the second electronic signal to a transmission side input of the second fabric portion.

31. An L-dimensional optoelectronic switch for transferring an optical signal from an input device to an output device, the optoelectronic switch including:
a plurality of leaf switches, each having a radix R, and arranged in an L-dimensional array, in which each dimension i has a respective size $R_i$ (i=1, 2, . . . , L), each leaf switch having an associated L-tuple of co-ordinates $(x_1, \ldots, X_L)$ giving its location with respect to each of the L dimensions;
wherein each leaf switch is a member of L sub-arrays, each of the L sub-arrays associated with a different one of the L dimensions, and including:
a plurality of $R_i$ leaf switches, whose co-ordinates differ only in respect of the $i^{th}$ dimension, each leaf switch having C client ports for connecting to an input device or an output device, and F fabric ports for connecting to spine switches; and
a plurality of $S_i$ spine switches, each having R fabric ports for connecting to the fabric ports of the leaf switches, and wherein, in a given sub-array each leaf switch in the sub-array is connected to each spine switch via an intermediate switch, wherein L is an integer greater than 1, wherein each of the spine switches is configured to perform switching in only one dimension and wherein a first spine switch of the spine switches is configured to perform switching in a first dimension of the L dimensions, and a second spine switch of the spine switches is configured to perform switching in a second dimension of the L dimensions.

32. An optoelectronic switch according to claim 31, wherein each of the spine switches contains the same components as each of the leaf switches.

33. An optoelectronic switch according to claim 32, wherein each spine switch includes:

a first fabric portion and a second fabric portion, connected respectively to a first fabric port and a second fabric port for processing signals and communicating with leaf switches or optical active switches, the first fabric portion having a transmission side and a receiving side, wherein the transmission side includes:

a transmission side input for receiving a first electronic signal carrying information including information about a destination leaf switch of the first electronic signal, the first electronic signal being received from an output of the second fabric portion;

a modulator for converting said first electronic signal into a first plurality of optical signals containing the same information;

a transmission side multiplexer for converting the first plurality of optical signals into a multiplexed fabric output signal for transmission to an input of an optical active switch;

wherein the receiving side includes:

a receiving side demultiplexer for receiving a multiplexed fabric input signal from an output of an optical active switch, and converting said multiplexed fabric input signal into a second plurality of optical signals;

a photodetector for converting said second plurality of optical signals into a second electronic signal; and a receiving side output for sending the second electronic signal to a transmission side input of the second fabric portion.

34. An optoelectronic switch according to claim 31, wherein each intermediate switch is an electronic active switch or an electronic packet switch.

35. An optoelectronic switch according to claim 31, wherein each of the intermediate switches contains the same components of each of the spine switches and/or each of the leaf switches.

36. An optoelectronic switch according to claim 35, wherein each intermediate switch includes:

a first fabric portion and a second fabric portion, connected respectively to a first fabric port and a second fabric port for processing signals and communicating with leaf switches or spine switches, the first fabric portion having a transmission side and a receiving side, wherein the transmission side includes:

a transmission side input for receiving a first electronic signal carrying information including information about a destination leaf switch of the first electronic signal, the first electronic signal being received from an output of the second fabric portion;

a modulator for converting said first electronic signal into a first plurality of optical signals containing the same information;

a transmission side multiplexer for converting the first plurality of optical signals into a multiplexed fabric output signal for transmission to an input of a spine switch or a leaf switch;

wherein the receiving side includes:

a receiving side demultiplexer for receiving a multiplexed fabric input signal from an output of a leaf switch or a spine switch, and converting said multiplexed fabric input signal into a second plurality of optical signals;

a photodetector for converting said second plurality of optical signals into a second electronic signal; and a receiving side output for sending the second electronic signal to a transmission side input of the second fabric portion.

\* \* \* \* \*